Nov. 25, 1952 — W. F. GLASER ET AL — 2,619,197
ELEVATOR SYSTEM
Filed Sept. 16, 1950 — 20 Sheets-Sheet 2

WILLIAM FRANK GLASER
STEPHEN ANTHONY HORNUNG } INVENTORS
BY [signature] ATTORNEY

WILLIAM FRANK GLASER
STEPHEN ANTHONY HORNUNG } INVENTORS

BY J.L. Aharon ATTORNEY

Figure 1:
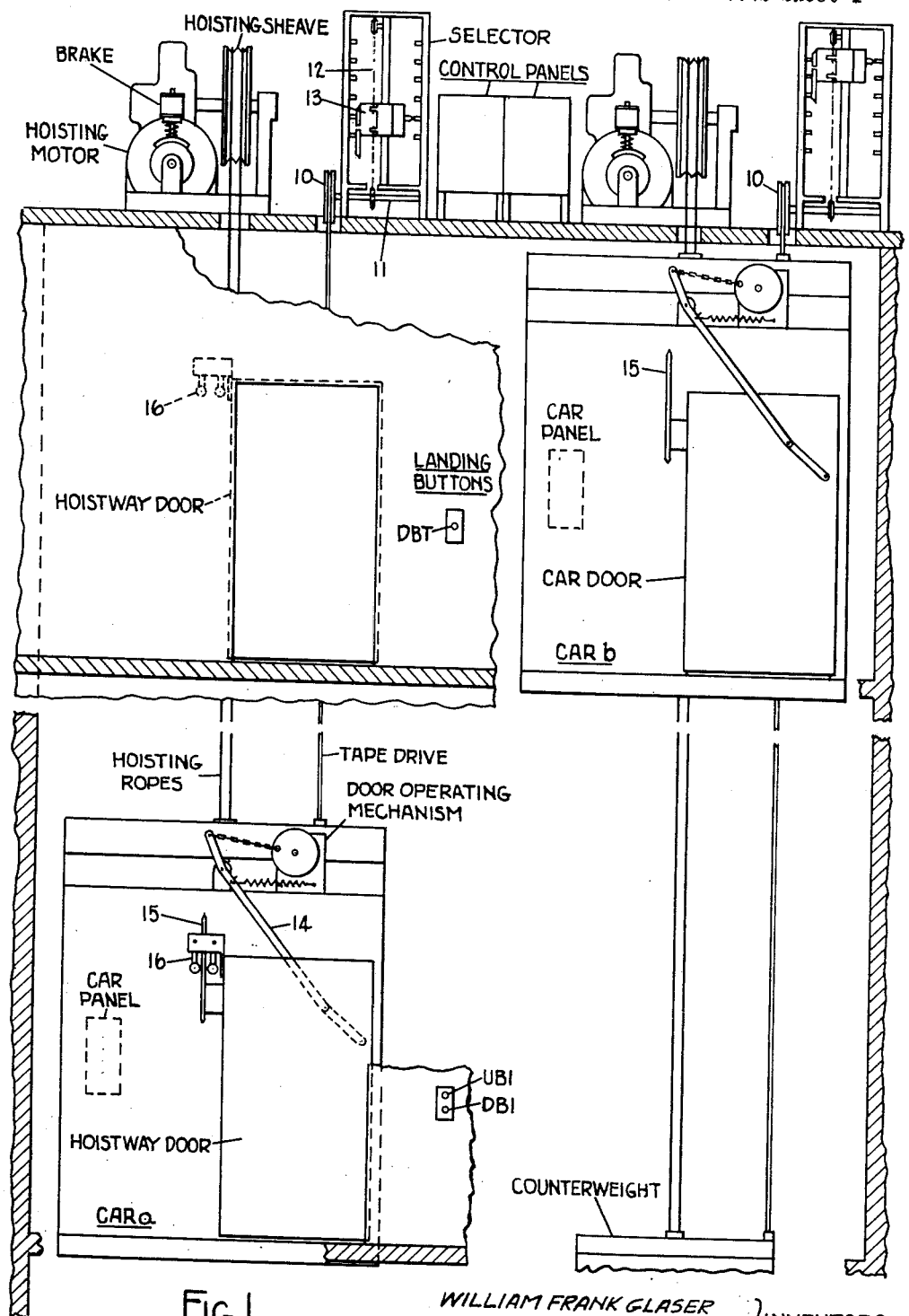
Figure 4S:
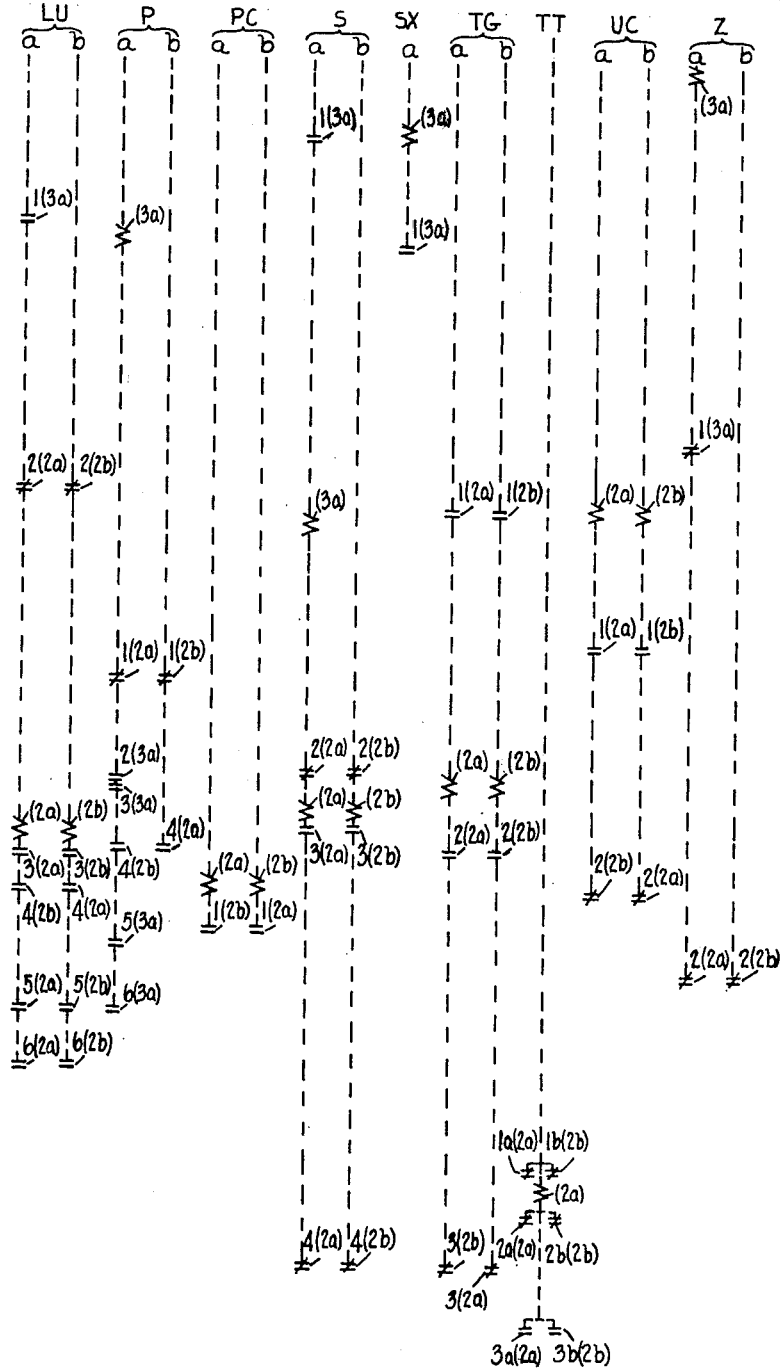

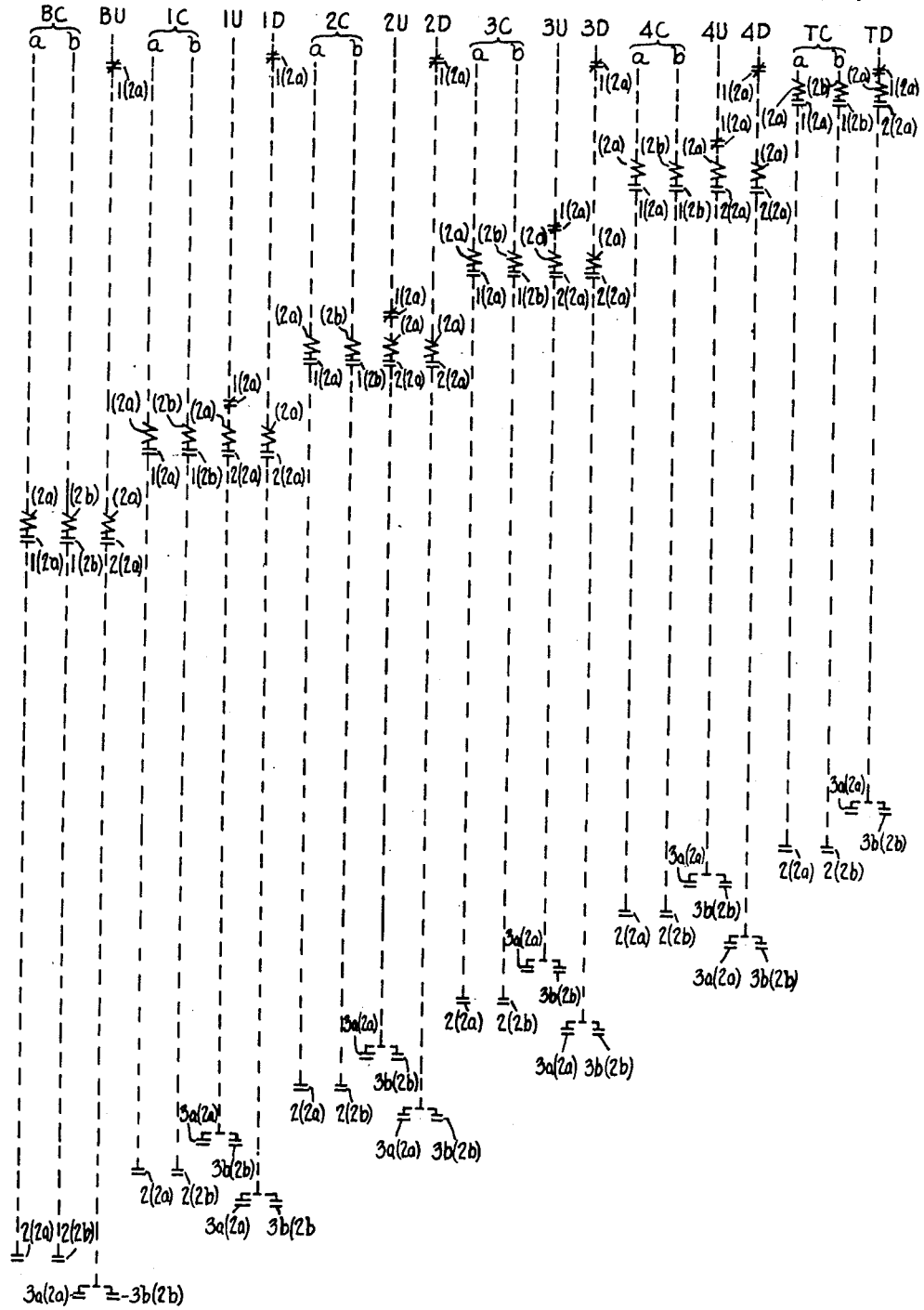
FIG 4s1

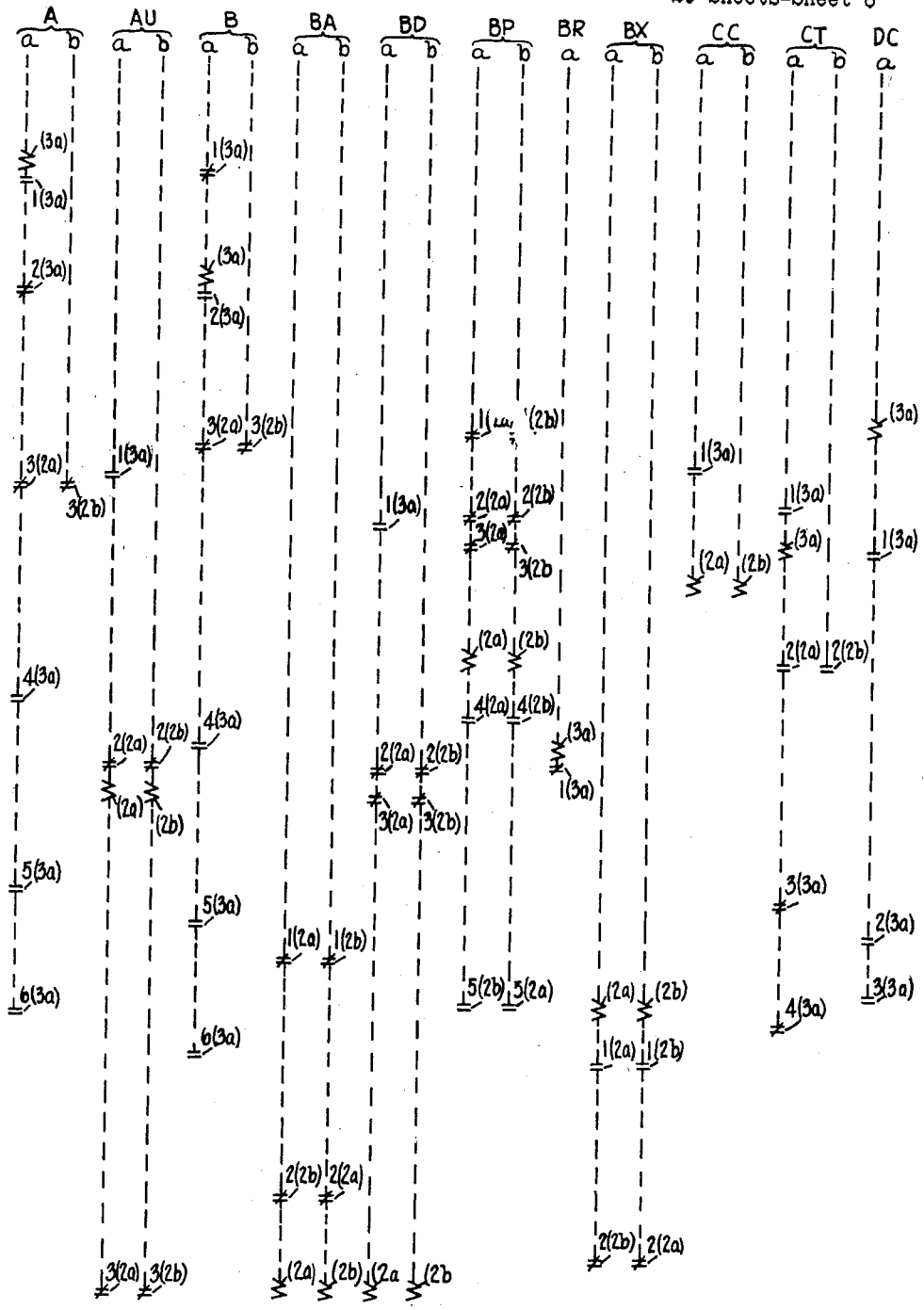
FIG 4s2

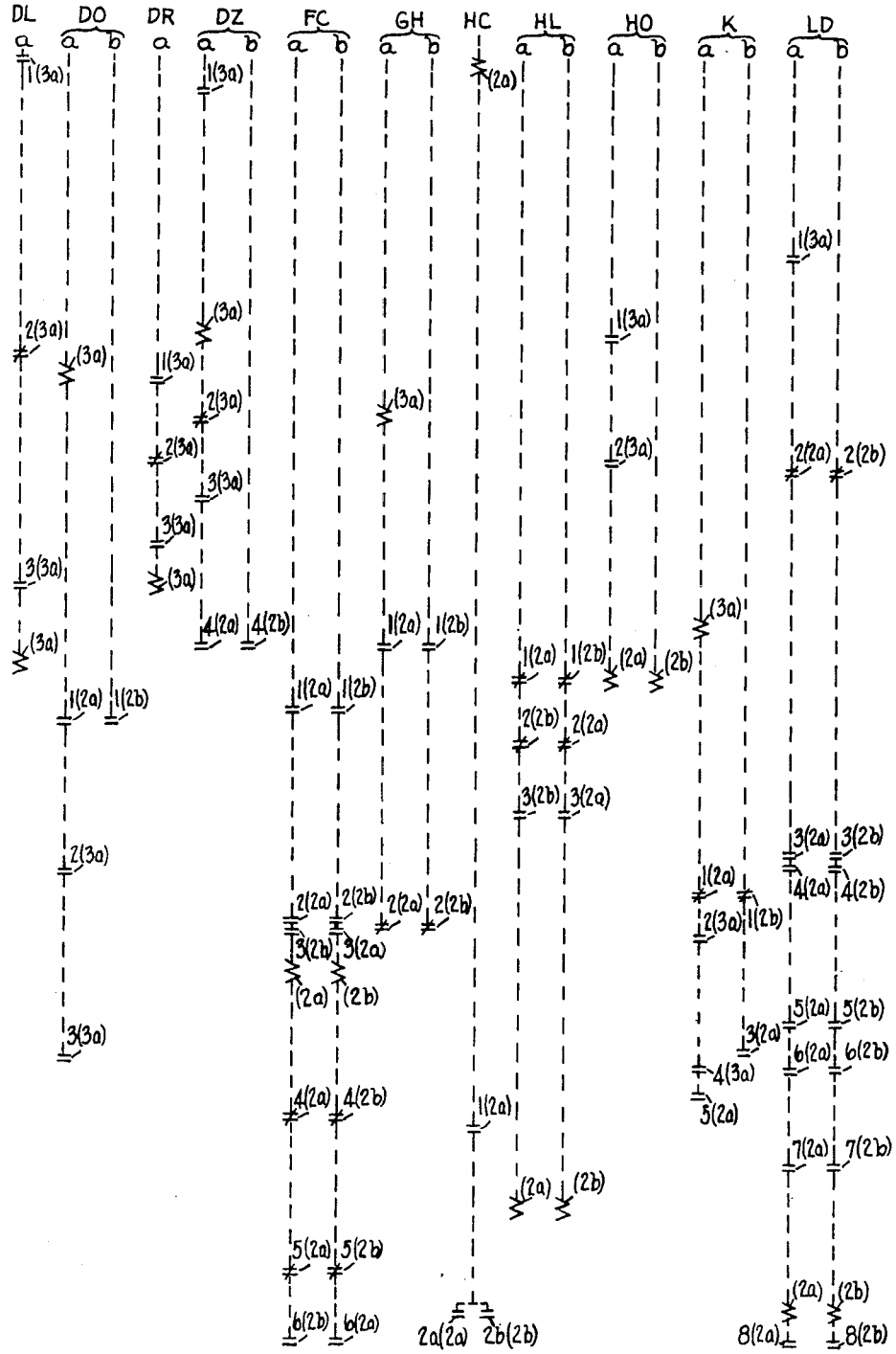
FIG.4s3

Nov. 25, 1952 — W. F. GLASER ET AL — 2,619,197
ELEVATOR SYSTEM
Filed Sept. 16, 1950 — 20 Sheets-Sheet 8

WILLIAM FRANK GLASER
STEPHEN ANTHONY HORNUNG } INVENTORS
BY J. L. Sharon ATTORNEY Nov. 25, 1952 W. F. GLASER ET AL 2,619,197
ELEVATOR SYSTEM
Filed Sept. 16, 1950 20 Sheets-Sheet 9

WILLIAM FRANK GLASER
STEPHEN ANTHONY HORNUNG } INVENTORS

BY J. L. Aaron ATTORNEY

Nov. 25, 1952 — W. F. GLASER ET AL — 2,619,197
ELEVATOR SYSTEM
Filed Sept. 16, 1950 — 20 Sheets-Sheet 11

WILLIAM FRANK GLASER
STEPHEN ANTHONY HORNUNG } INVENTORS

BY J. L. Sharon ATTORNEY

Nov. 25, 1952     W. F. GLASER ET AL     2,619,197
ELEVATOR SYSTEM
Filed Sept. 16, 1950     20 Sheets—Sheet 12

WILLIAM FRANK GLASER
STEPHEN ANTHONY HORNUNG } INVENTORS

BY J. L. Sharon ATTORNEY

Nov. 25, 1952 W. F. GLASER ET AL 2,619,197
ELEVATOR SYSTEM
Filed Sept. 16, 1950 20 Sheets-Sheet 13

WILLIAM FRANK GLASER
STEPHEN ANTHONY HORNUNG } INVENTORS

BY J. L. Sharon ATTORNEY

Nov. 25, 1952   W. F. GLASER ET AL   2,619,197
ELEVATOR SYSTEM
Filed Sept. 16, 1950   20 Sheets-Sheet 14

WILLIAM FRANK GLASER
STEPHEN ANTHONY HORNUNG  } INVENTORS

BY  J. L. Sharon  ATTORNEY

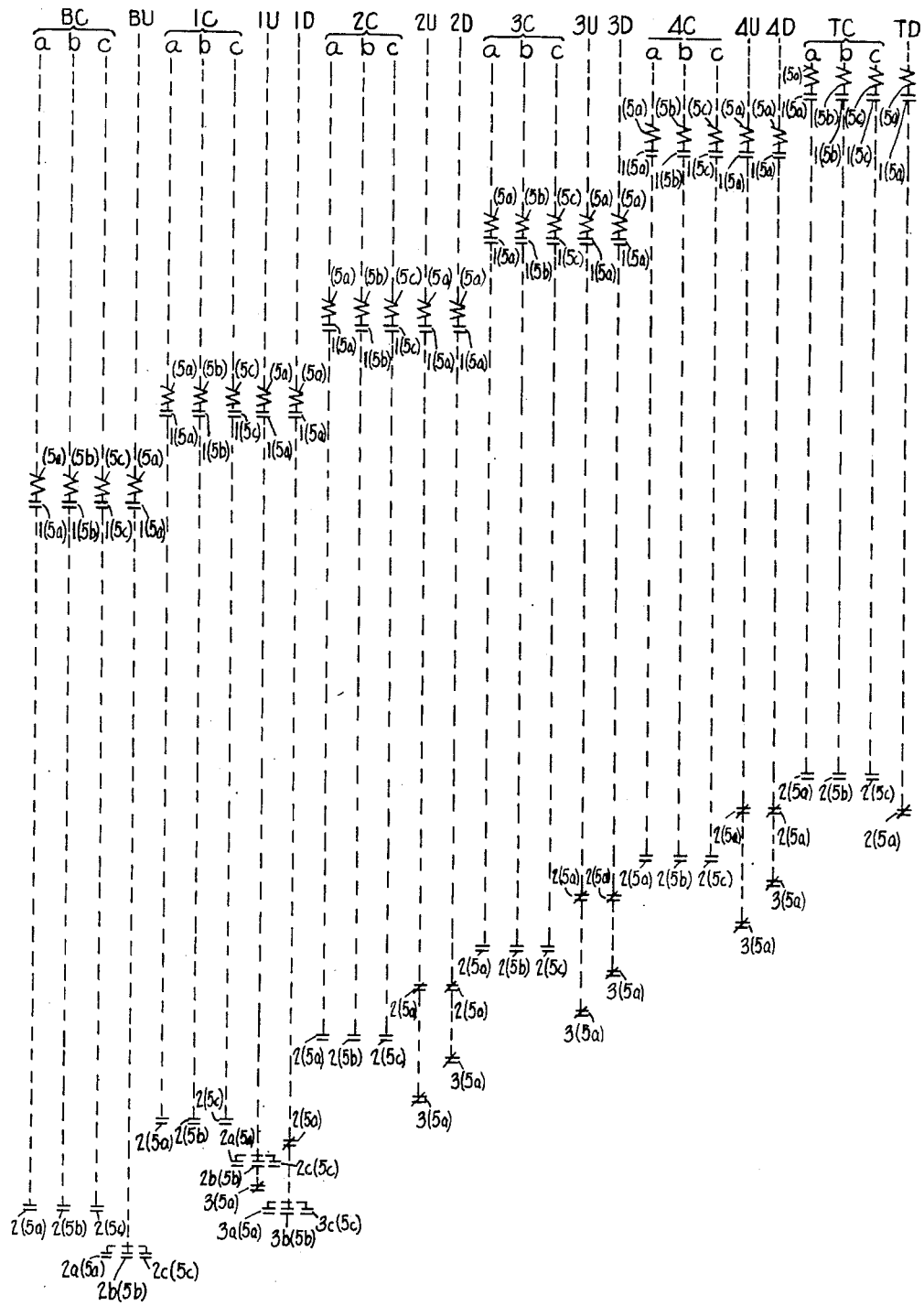
FIG. 7s1

FIG. 7s2

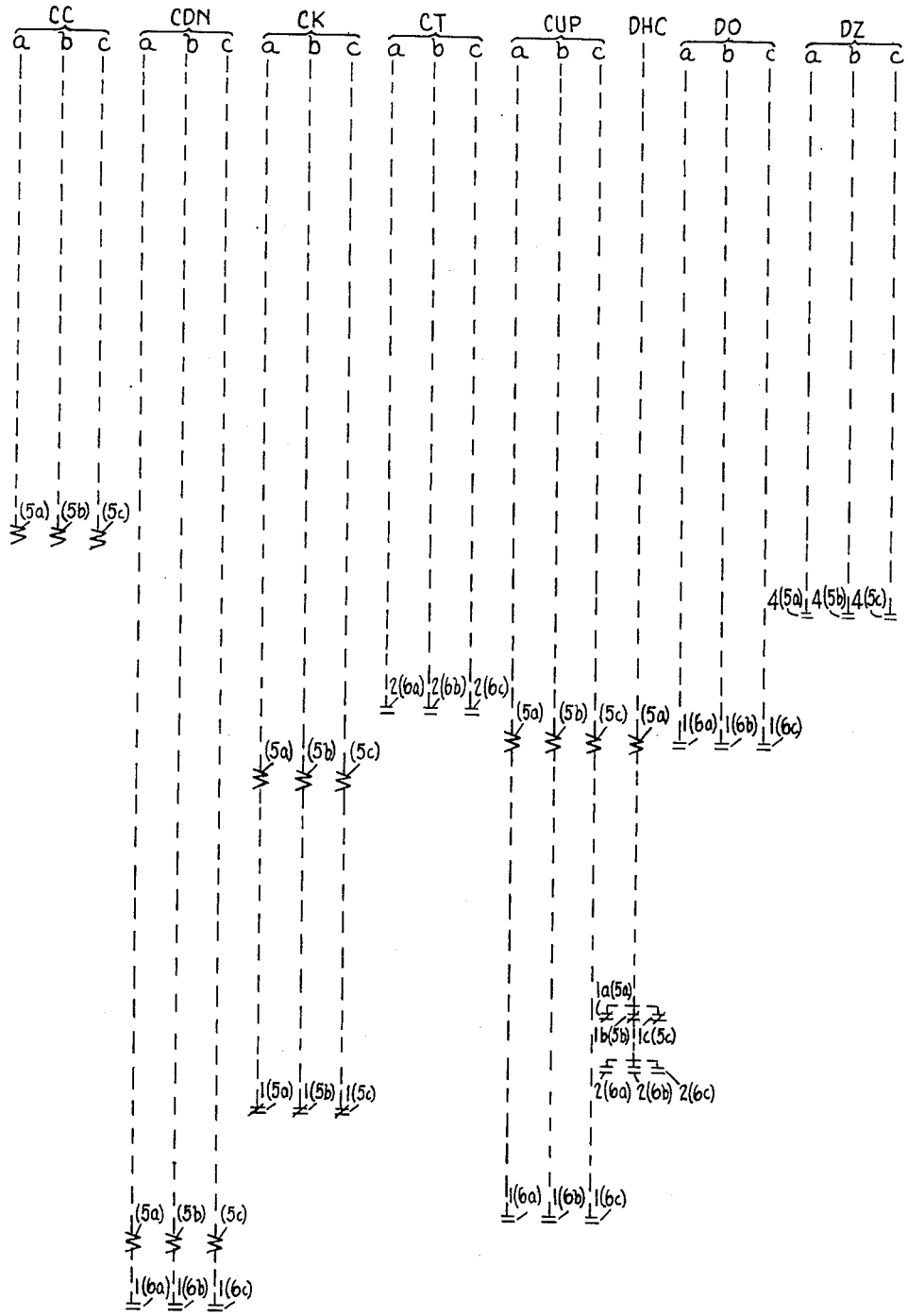
Fig. 7s3

Nov. 25, 1952 W. F. GLASER ET AL 2,619,197
ELEVATOR SYSTEM
Filed Sept. 16, 1950 20 Sheets-Sheet 18

FIG. 7s4

WILLIAM FRANK GLASER
STEPHAN ANTHONY HORNUNG } INVENTORS

BY J. L. Sharon ATTORNEY

Figure 5A:
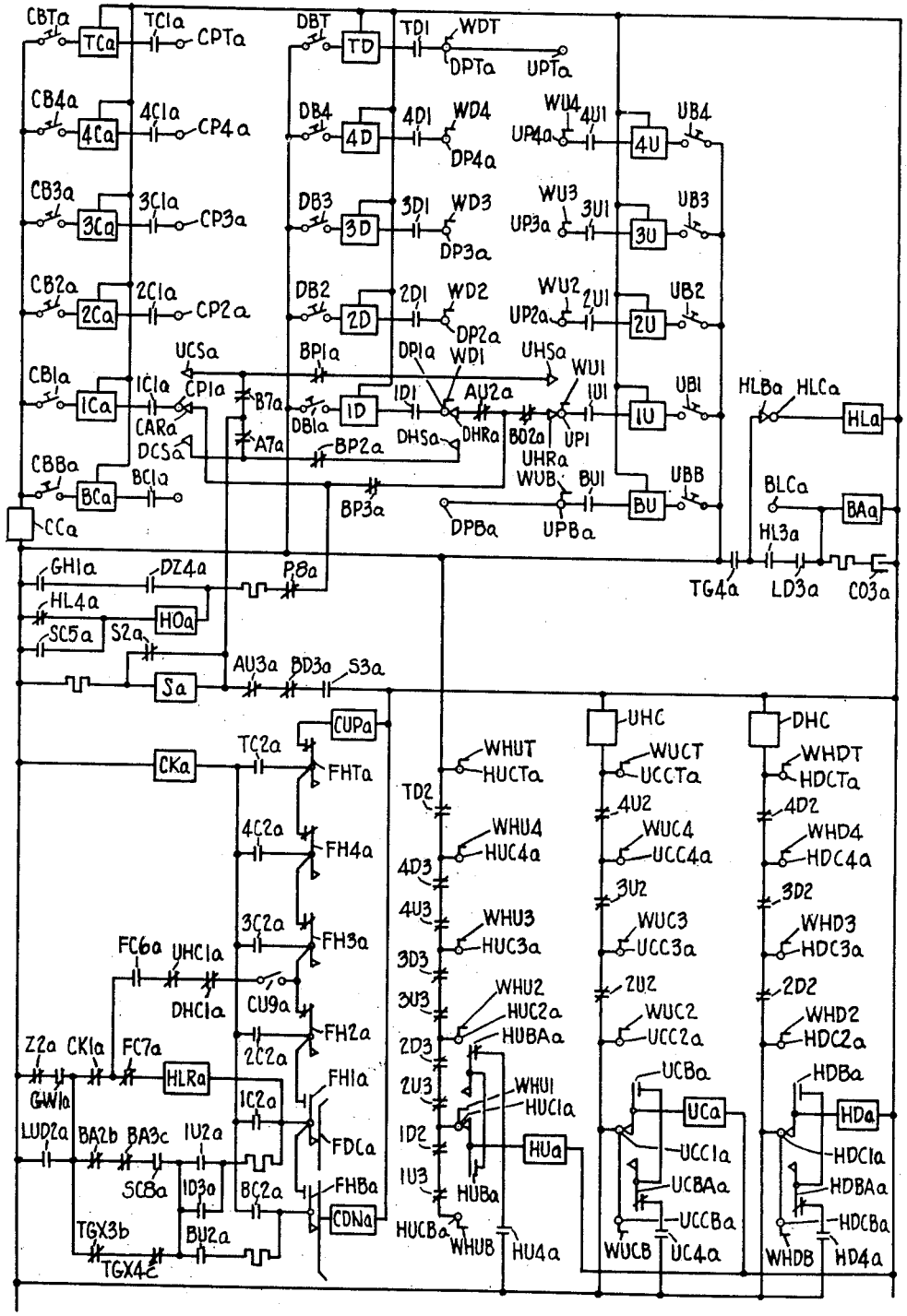
Figure 5B:
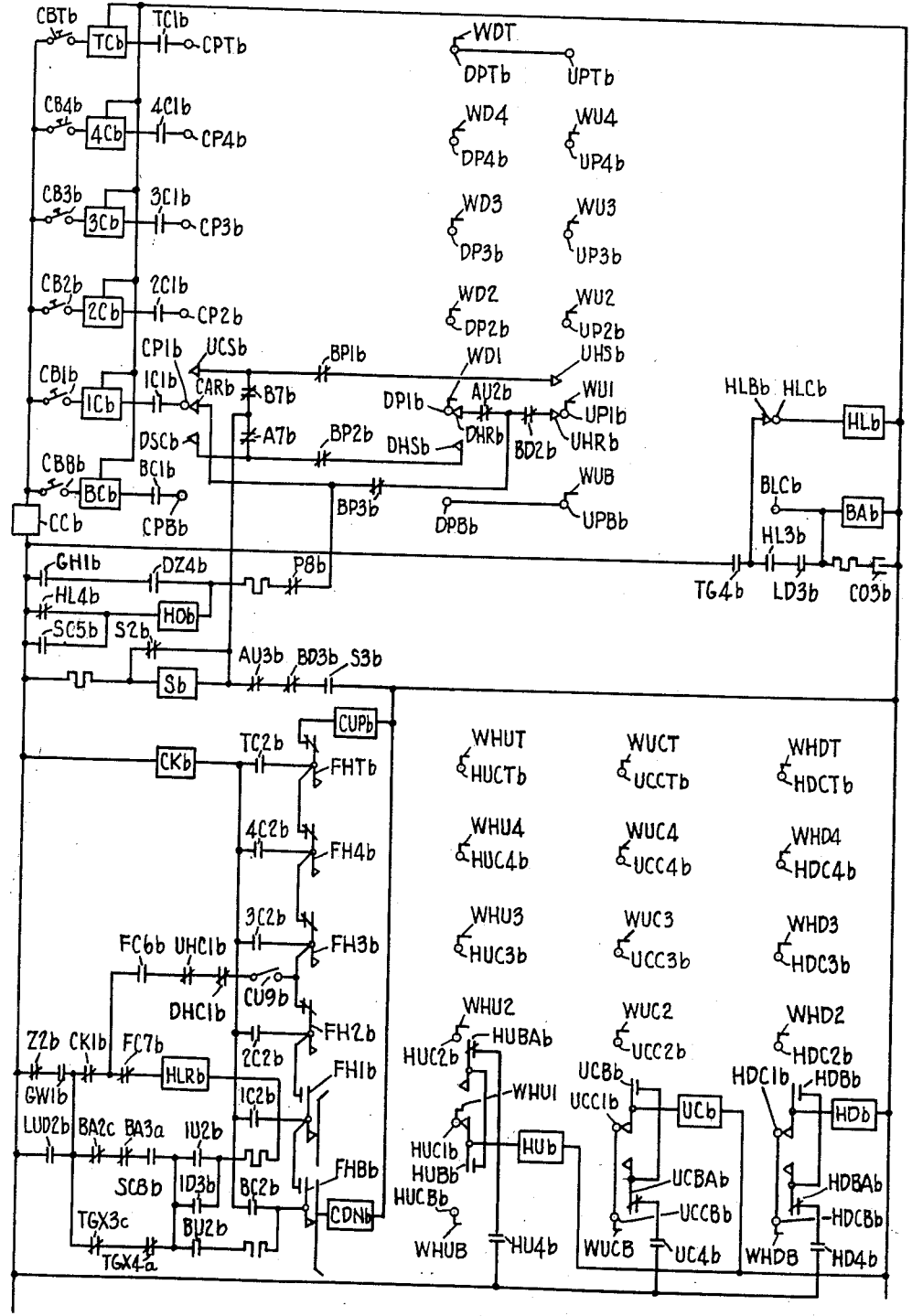
Figure 5C:
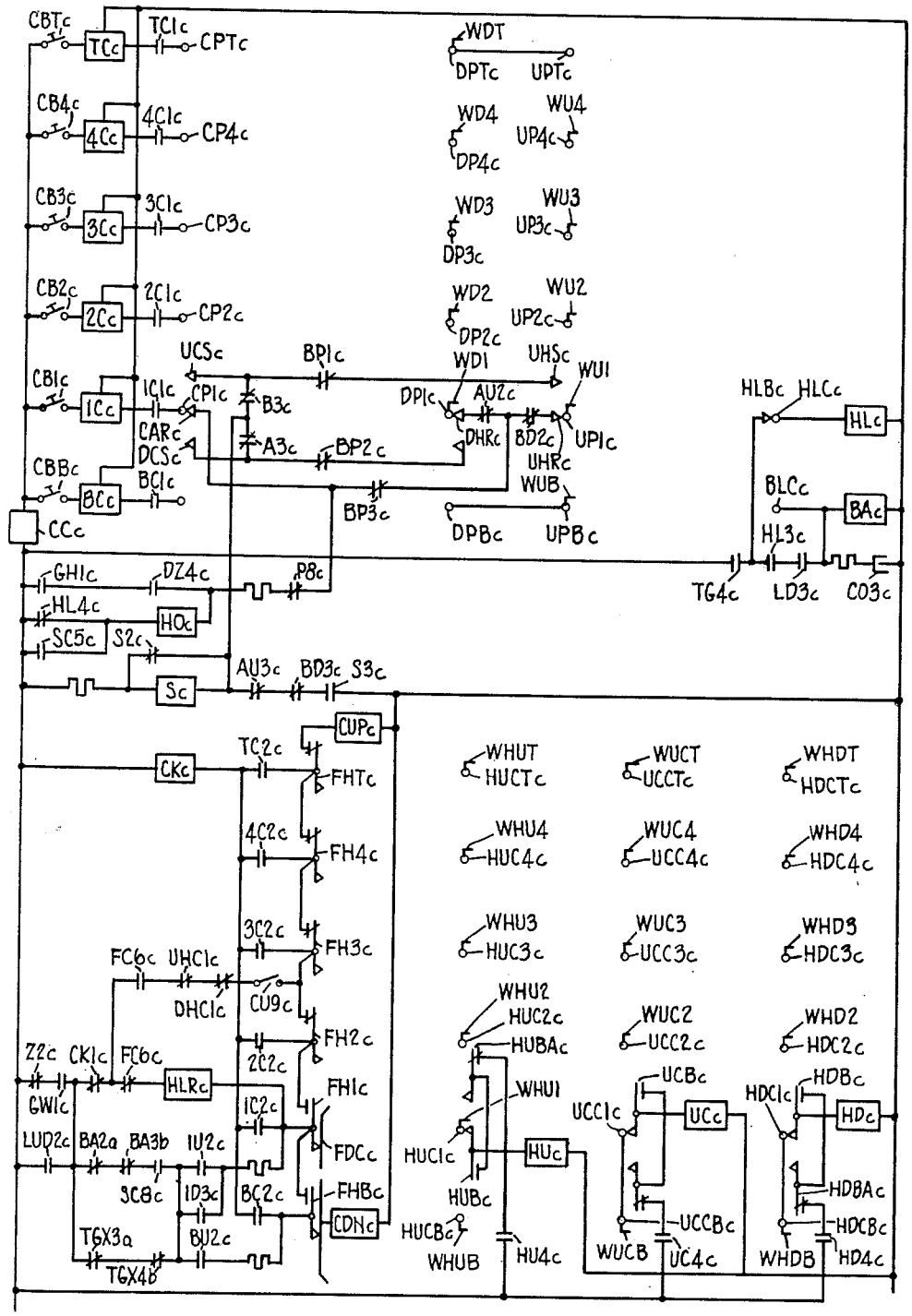
Figure 6A:
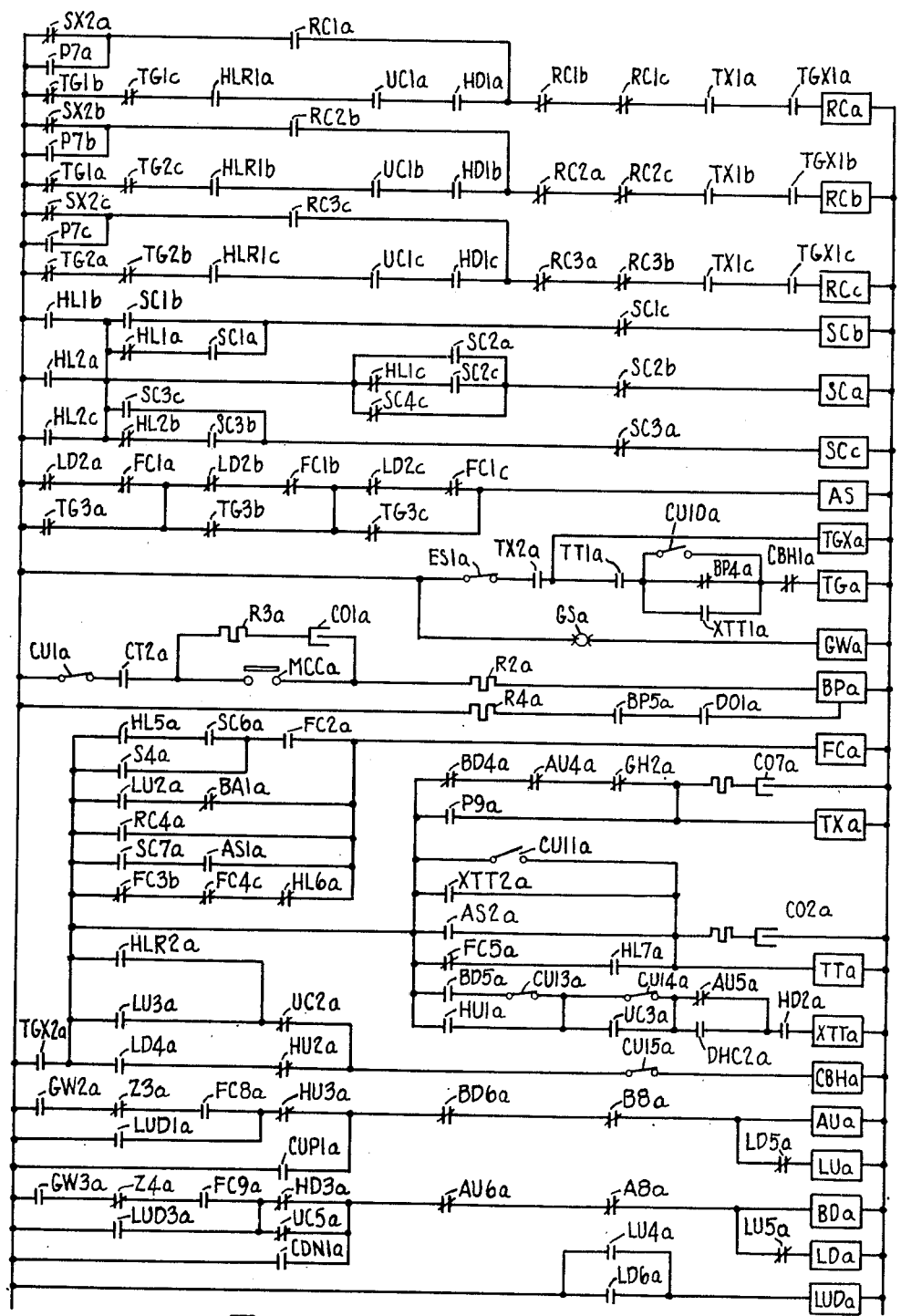
Figure 6B:
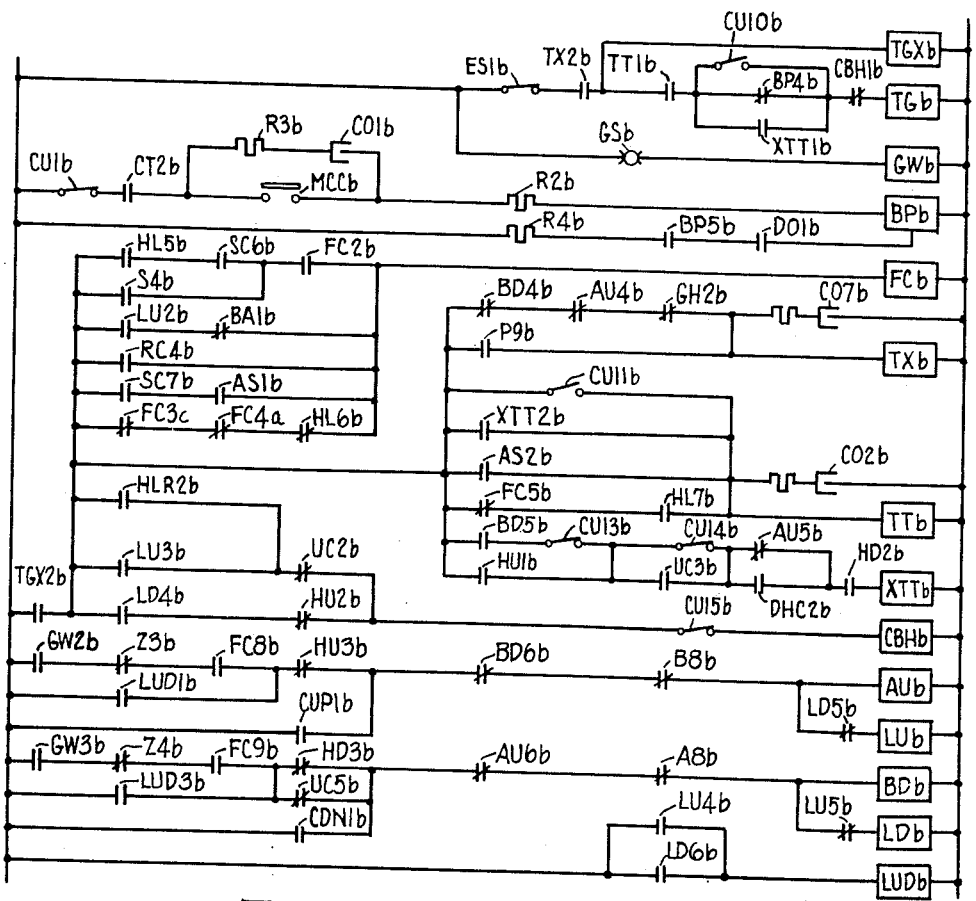
Figure 6C:
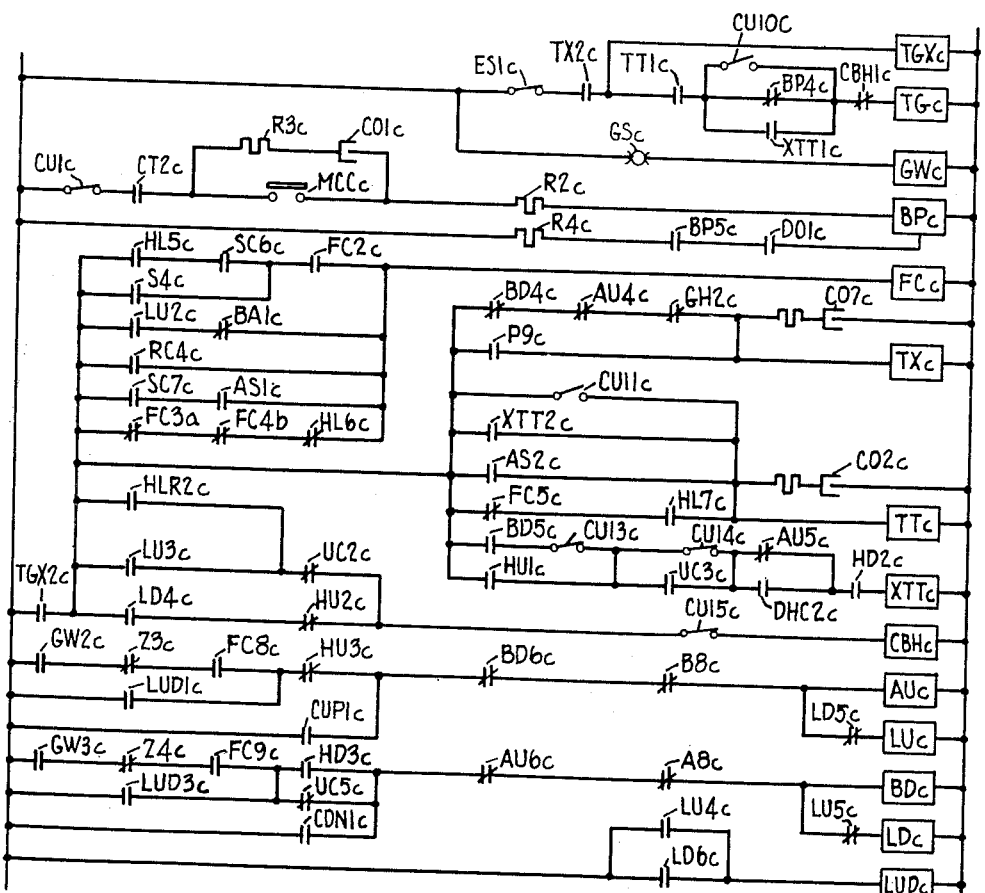

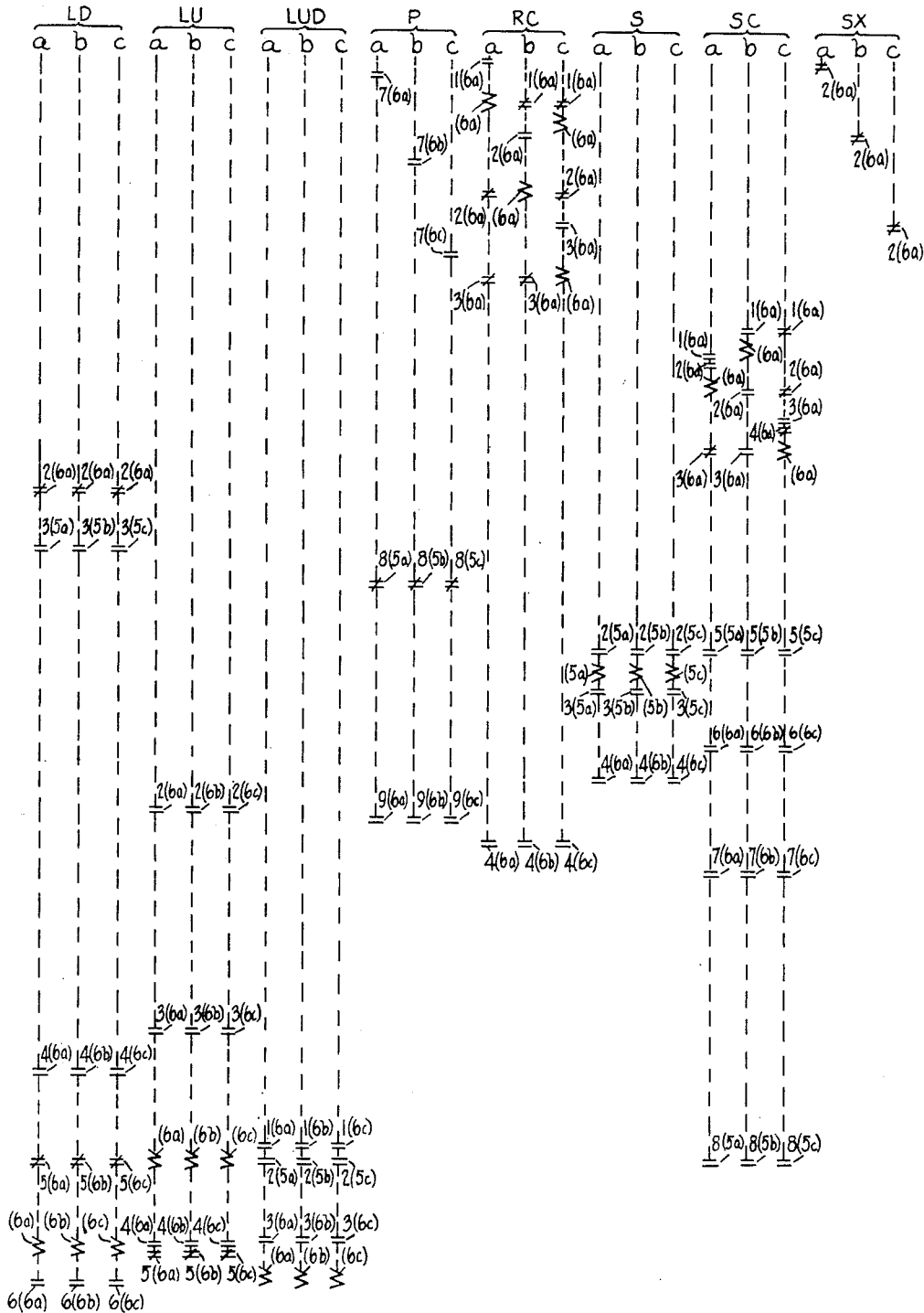
FIG. 7s5

FIG. 7s6

Patented Nov. 25, 1952

2,619,197

UNITED STATES PATENT OFFICE 2,619,197

ELEVATOR SYSTEM

William Frank Glaser, Eastchester, and Stephen Anthony Hornung, New York, N. Y., assignors to Otis Elevator Company, New York, N. Y., a corporation of New Jersey Application September 16, 1950, Serial No. 185,256

38 Claims. (Cl. 187—29)

1

The invention relates to control systems for a plurality of elevator cars.

The invention is directed to elevator control systems of the "collective" type. In such systems buttons are provided in the cars and at the landings for actuation by the passengers and intending passengers to effect the registration of calls and thus create a demand for service. In simplex collective systems, i. e., a system which controls a single elevator car, the registration of either a car call or a landing call starts the car. Once started, the car stops at all landings for which calls are registered, restarting automatically after each stop until all calls are responded to, thereby satisfying the demand for service. In multiplex collective systems, i. e., systems for controlling two or more elevator cars, the cars are under the control of their respective car buttons and of landing buttons common to the cars. Each car is started in operation by the registration of a car call for that car, but it is customary practice to start but one car in operation in response to the registration of a landing call. Various arrangements have been proposed to start another car in operation to assist a car already in operation. For example, an idle car may be started in operation when a landing call is registered which is behind the car or cars already in operation. Such a system is disclosed in the patent to Waters, Paulson, and Troster, Number 2,100,176, granted November 23, 1937.

The present invention is especially directed to the control of the bringing of a car to the assistance of another car or cars in a multiplex collective control system. There is advantage in collective control systems in automatically preventing the stopping of a car in response to landing calls when the car is loaded to a certain percent of capacity, this operation being usually known as automatic load non-stop. The invention is applicable to systems with or without automatic load non-stop operation.

One feature of the invention is to automatically bring a car to the assistance of another car when there has been a continuous demand for service from the landings for a certain period of time.

Another feature of the invention, applicable to systems with automatic load non-stop operation, is to automatically bring a car to the assistance of another car upon the automatic load non-stopping of such other car.

Other features and advantages of the invention will become apparent from the following description and appended claims.

There is considerable advantage in bringing a car to the assistance of the car or cars responding to calls under conditions where a landing call is registered which is behind the latter car or cars, and the invention will be described as applied to such a system. As set forth in the

2 aforementioned Waters, Paulson, and Troster patent, as to what constitutes a call behind depends upon other characteristics of the system. In the system illustrated in that patent as applied to two elevators with an up button and a down button at each intermediate landing, a landing call behind the car in operation is an up call for a landing below the car when the car is set for upward travel and either an up call or a down call for a landing above the car when the car is set for downward travel. In that system when all calls are responded to one car becomes a "home station car," i. e., it returns to the home station, usually the lobby floor, and the other car remains at the floor at which its last stop is made and becomes a "free car." Either car may be the free car and the other the home station car. Upon the registration of a landing call under conditions where both cars are idle, the free car starts in operation and becomes a "busy car." The registration of a landing call behind the busy car starts the home station car and it too becomes a busy car. There are many other conditions that govern the operation of the cars as set forth for example in the aforesaid Waters, Paulson, and Troster patent.

The present invention is particularly suitable for a system in which, when all calls are answered, in a duplex arrangement for example one car returns to a home station and the other car becomes a free car, whether or not the control of the home station car is effected in response to a landing call behind the busy car. As applied to such system, the invention involves automatically starting the home station car when, for a predetermined period after the registration of any landing call, there has been continuous landing call registration. This condition may be satisfied by a single landing call or by several landing calls in overlapping relation. Also as applied to such system, and where the cars are arranged to be automatically non-stopped when loaded to a certain percent of capacity, the invention involves automatically starting the home station car as soon as the car in operation is non-stopped. In each arrangement where a car is on its return to the home station when such condition arises, its return to the home station may be interrupted. These two control arrangements may supplement each other in the same system, may be used singly and may be used in combination with an arrangement for controlling the home station car in response to calls behind the busy car or in combination with other arrangements for controlling the operation of an assisting car. While the invention is especially applicable to duplex elevator control, it is also applicable to the control of more than two elevators. It is preferred, especially in systems of more than two elevators where continuous call registration control is combined with call behind control, to subject the continuous call registration control to calls ahead of the busy car or cars and, where by-pass control is combined with call behind control, to render the by-pass control effective only when a landing call is in registration ahead of the car which is by-passing. However, if the call behind control is not provided, it is preferred to subject the continuous call control to any landing call and that the by-pass control be effective to start another car when any landing call is in registration.

Figure 2A:
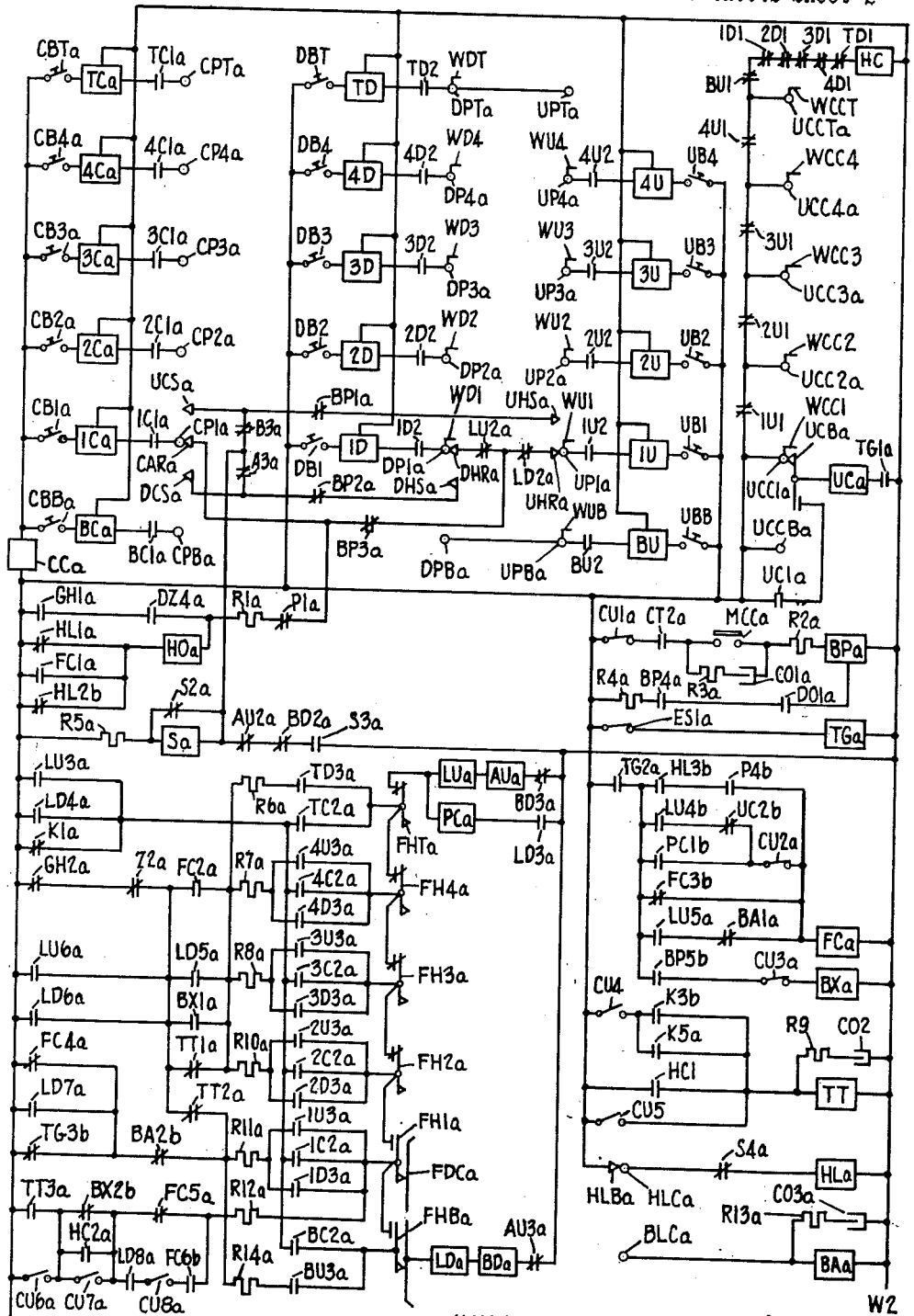
Figure 2B:
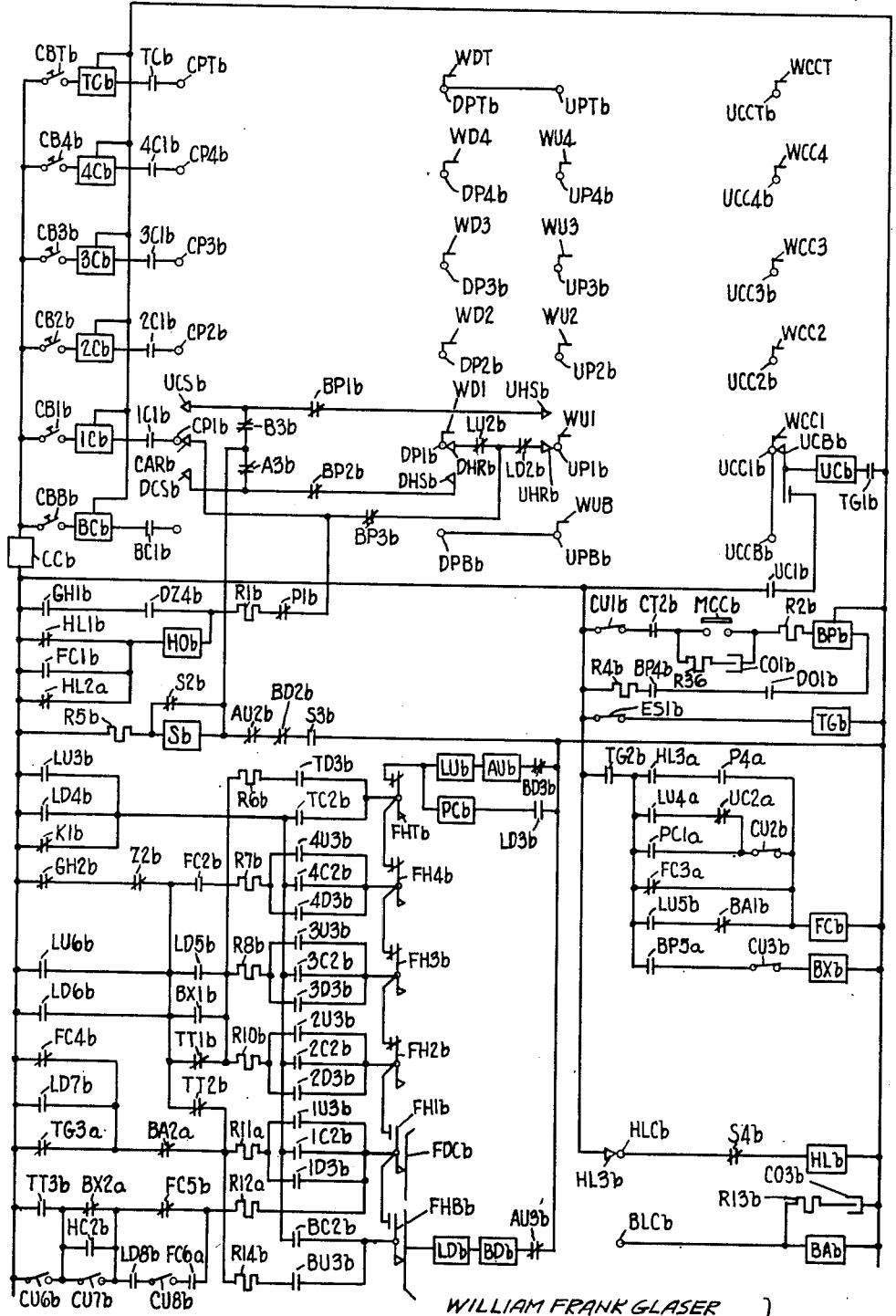
Figure 3A:
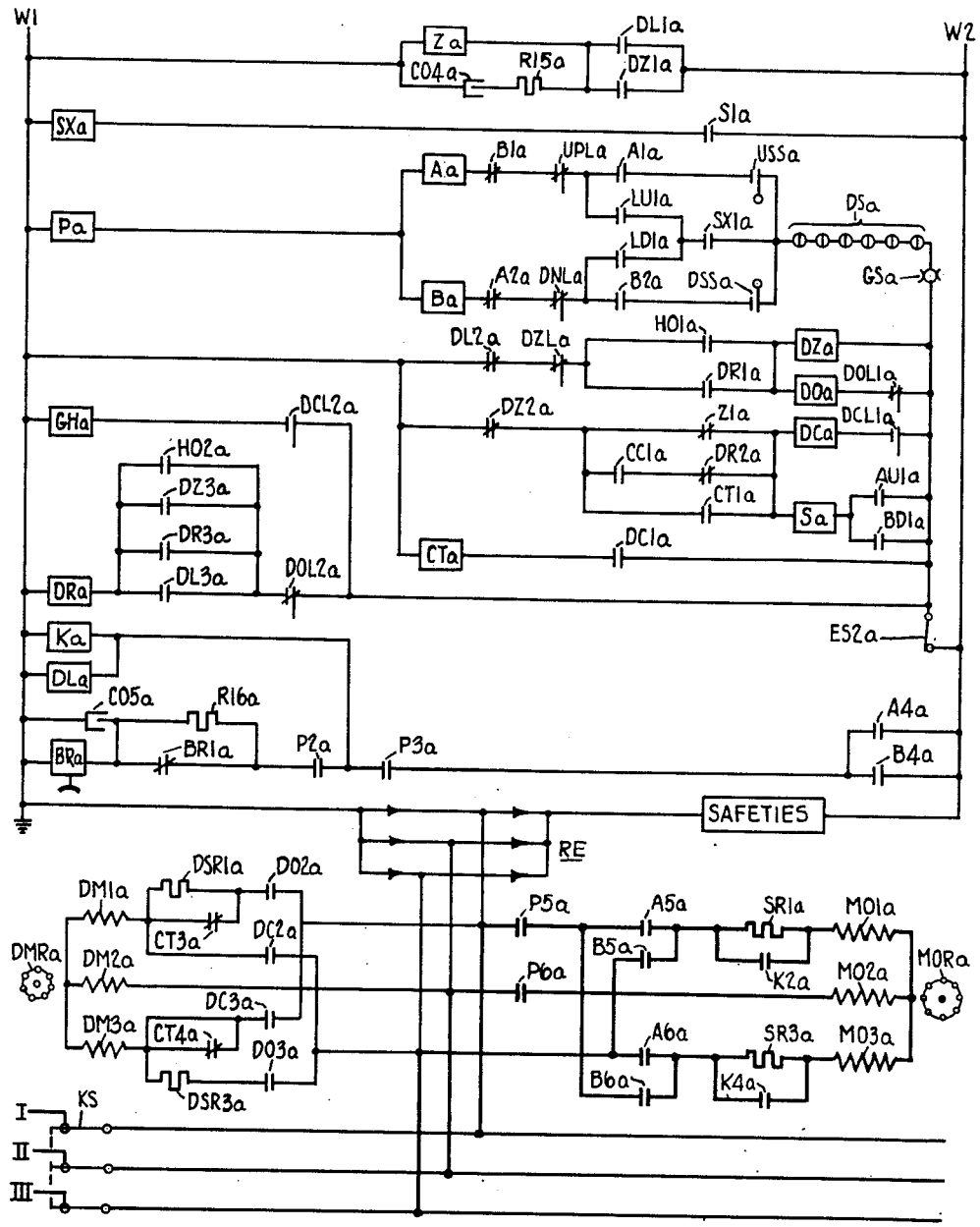

In the drawings:

Figure 1 is a simplified schematic representation of an installation of two elevators in accordance with the invention;

Figures 2a and 3a taken together constitute a simplified schematic wiring diagram of the power and control circuits for one of the elevators of Figure 1, certain of the circuits being common to the elevators;

Figure 2b is a simplified schematic wiring diagram of the control circuits of another of the elevators in Figure 1, corresponding to those of Figure 2a;

Figures 4s1, 4s2, 4s3 and 4s4 are key sheets for Figures 2a, 2b and 3a, showing the electromagnetic switches in spindle form, Figure 4s1 being restricted to floor relays.

Figures 5a and 6a, 5b and 6b, and 5c and 6c constitute simplified schematic wiring diagrams of portions of the control circuits which may be utilized in applying the invention to more than two elevators; and Figures 7s1, 7s2, 7s3, 7s4, 7s5 and 7s6 are key sheets for Figures 5a, 6a, 5b, 6b, 5c and 6c, Figure 7s1 being restricted to floor relays.

For a general understanding of the invention reference may be had to Figure 1, wherein various parts of a duplex elevator system chosen to illustrate the principles of the invention are indicated by legend and reference characters. The arrangement is the same for each elevator. Each car is raised and lowered by means of a hoisting motor, which motor drives a traction sheave over which pass hoisting ropes for the car and counterweight. An electromagnetic brake is provided and is applied to effect the final stopping operation and to hold the car when at rest.

Each elevator is provided with a floor selector through which the direction of car travel is established and the stopping of the car is effected. The floor selector is driven by means of a tape attached at one end to the top of the car from which point it extends upwardly to and over the selector drive wheel 10 and thence downwardly to the counterweight to which the other end of the tape is connected. The drive wheel is arranged on the selector drive shaft 11. The drive shaft drives a chain 12 which is attached to and drives a crosshead 13. The crosshead carries brushes for engaging stationary contacts for the various floors and also carries a direction cam for engaging combination brush and switches utilized in direction and call behind circuits, hereinafter called direction switches. These elements will be pointed out in connection with the wiring diagrams.

An up button and a down button are arranged at each intermediate floor and a single button is arranged at each terminal floor. Where basement service is provided, as will be described, the first floor is provided with both an up button and a down button. These buttons are known as landing buttons and are common to the cars. Each elevator car is provided with an independent set of buttons, one button being provided for each floor. These buttons are arranged on a car panel and are known as car buttons. The invention will be described in connection with landing buttons and car buttons of the push type which act through floor relays which, in conjunction with the selectors and other control apparatus, control the operation of the cars. The floor relays and certain of the control switches may be arranged on the floor selectors. Other electromagnetic control switches are provided on the control panels.

Each elevator car is provided with door operating mechanism for the car and hoistway doors. This mechanism actuates the car door through a lever 14 and the connection to the hoistway doors is effected through a vane 15 on the car door and rollers 16 on each hoistway door. Such mechanism will not be described in detail as it is well understood in the art.

Reference may now be had to the wiring diagrams of Figures 2a, 2b and 3a. Figure 2a shows various control circuits for one of the elevators including the call registering circuits, call pick-up and automatic call cancelling circuits, direction, home landing and highest call circuits and circuits for bringing the car to the assistance of the other car under certain conditions of operation. Figure 2b shows similar circuits for the other elevator but does not include certain circuits of Figure 2a which are common to both elevators. Figures 3a shows further control circuits and power circuits for one elevator. Similar circuits are provided for the other elevator which are not shown.

To facilitate disclosure of an application of an invention, the control system illustrated has been considerably simplified as compared with control systems utilized in commercial installations. It is to be understood that in applying the invention to control systems used commercially, many changes may be made, especially in adapting the invention to the more comprehensive circuits and to control features and apparatus not here shown.

For convenience, the invention will be described as applied to a system having a three-phase alternating current power supply. The alternating current supply mains are designated I, II and III. KS is a triple pole knife switch for connecting the system to the supply mains. A polyphase rectifier RE is utilized to provide direct current derived from the alternating current supply mains for operating the floor relays and electromagnetic switches. The direct current feed lines W1 and W2 from the rectifier extend from Figure 3 into Figure 2. A similar arrangement may be provided for each elevator. Cut-out switches for changing the type of service are designated generally as CU.

The electromagnetic switches employed in the control system have been designated as follows:

A, Up reversing switch
AU, Up reversing switch relay
B, Down reversing switch
BA, Basement switch
BD, Down reversing switch relay
BP, By-pass switch
BX, Auxiliary by-pass switch
CC, Car button relay
CT, Reverse resistance relay
DC, Door close switch
DL, Auxiliary door relay
DO, Door open switch
DR, Door relay
DZ, Door reopen relay FC, Starting relay
GH, Auxiliary door closing relay
HC, Landing call relay
HL, Home landing relay
HO, Landing reopening relay
K, Accelerating switch
LD, Down auxiliary reversing switch relay
LU, Up auxiliary reversing switch relay
P, Main line switch
PC, Pass call switch
S, Stopping relay
SX, Auxiliary stopping relay
TG, Transfer switch
TT, Transfer timing relay
UC, Up call below switch
Z, Time relay Throughout the description which follows, these letters will be applied to the coils of the above designated switches. Also, with reference numerals appended thereto, they will be applied to the contacts of these switches. The release coil of the electromechanical brake is similarly designated BR and this coil and the contacts operated by the brake are included on the spindle sheets. Differentiation will be made between the elevators by appending to the characters employed to designate various elements of the system small case letters "a" and "b," indicative of the two elevators.

The circuits are shown in "straight," i. e., "across-the-line," form in which the coils and contacts of the various switches are separated in such manner as to render the circuits as simple and direct as possible. The relationship of the coils and contacts may be seen from Figures 4s1, 4s2, 4s3 and 4s4 wherein the coils and contacts of the various switches are positioned on spindles. The floor relays are shown in Figure 4s1 wherein they are arranged in alphabetical and numerical sequence. The other switches are shown in Figures 4s2, 4s3 and 4s4 wherein they are arranged in alphabetical sequence. Taking any one of the spindle sheets, each switch thereon has all its contacts and coils on that particular spindle sheet. The coils and contacts are related to the wiring diagrams by applying in brackets to the particular coil or contact the number of the figure in which it occurs, this being appended to the particular designation for the contacts. Each coil and contact is positioned on the spindle sheet in alignment with its position on the particular wiring diagram. Thus a coil or contact of any particular switch may be found by taking the spindle sheet on which the switch is located, noting the number in brackets applied to the coil or contact and aligning that spindle sheet horizontally with the sheet on which the figure indicated is located. The coil or contact will then be found on that figure in horizontal alignment with that coil or contact on that spindle sheet. Thus to locate contacts DO1a for example, referring to spindle sheet 4s3 it will be found that contacts numbered 1 of switch DOa has the numeral 3a in brackets appended thereto. This means that these contacts appear in Figure 3a. The contacts may then be located by aligning the sheet on which Figure 3a appears with the sheet on which Figure 4s3 appears and will be found in Figure 3a in alignment with the contacts in Figure 4s3.

Referring to Figures 2a and 2b, circuits for a five floor plus basement installation have been illustrated. The landing buttons common to the cars are shown in Figure 2a where the up buttons are designated UB and the down buttons are designated DB. Numerals and the letters T for top floor and B for basement are appended to these letters indicating the floors for which the buttons are provided. The car buttons for car a are shown in Figure 2a and those for car b are shown in Figure 2b. The car buttons are designated CB and, as in the case of the landing buttons, have numerals and the letters T for top floor and B for basement appended thereto as indicative of the floors for which the car buttons are provided.

The floor relays through which the landing buttons and car buttons act are designated similarly to their controlling buttons, the car button floor relays being designated C and the landing button floor relays being designated U or D depending upon whether they are provided for up landing buttons or down landing buttons. These letters are appended to numerals and the letters T for top floor and B for basement which indicate the floors for which the relays are provided. The floor relays, when operated, remain in operated condition, thereby permitting the push buttons to be released. When the call is answered, the floor relay is reset, automatically cancelling the call. Various forms of floor relays may be utilized. A floor relay has been illustrated in which the relay, when operated is held in operated condition by residual magnetism.

The floor relays act to control the cars through the floor selectors. The various elements of the floor selector for car a are shown in Figure 2a while those for car b are shown in Figure 2b. These elements are the same for each elevator and will be described for but one of them. The direction cam carried by the crosshead is designated FDC and is made up of two sections, the lower one of which being electrically conductive and the upper one non-conductive. The direction switches with which the cam cooperates are designated FH. There is one of these switches for each floor and they are spaced in accordance with the distance between the floors for which they are provided. Each direction switch is a combination brush and switch. When the car is stopped at a floor, the brush portion of the direction switch for that rests on the center at the upper section of the direction cam. The brushes carried by the crosshead include up landing call pick-up and reset brush UHS, down landing call pick-up and reset brush DHS, car call pick-up and reset brush UCS for up car travel, car call pick-up and reset brush DCS for down car travel, up landing call auxiliary reset brush UHR, down landing call auxiliary reset brush DHR and car call auxiliary reset brush CAR. The stationary contacts engaged by the car call brushes are designated CP, those engaged by the up landing call brushes are designated UP and those engaged by the down landing call brushes are designated DP. An additional combination brush and switch UCB is carried by the crosshead for cooperating with stationary contacts UCC, one for each floor, and have to do with registering that an up call exists below the car when it is set for upward travel. In addition to the above elements each selector is provided with a home landing stationary contact HLC, and a basement landing stationary contact BLC adapted, when the car is at the home landing and basement respectively, to be engaged by home landing brush HLB carried by the crosshead. The various stationary contacts are spaced in accordance with the distances between the floors for which they are provided. The stationary contacts and the direction switches FH are differentiated as to floors by appended reference numerals plus the letters T for top floor and B for basement. An up stop switch USS and a down stop switch DSS are carried by the crosshead and are operated by cams, one for each floor, as the car arrives at the respective floors in the direction for which the stop switches are provided. Corresponding stationary contacts DP, UP and UCC of the selectors of Figures 2a and 2b are connected together by cross connecting wires designated generally as WD, WU and WCC respectively.

It is believed that an understanding of the invention will be facilitated by first describing the operation of starting and stopping an elevator car, say car $a$, together with the mechanisms and circuits employed.

The elevator hoisting motor is illustrated as a three-phase squirrel cage induction motor. The stator windings of the motor are designated MO1a, MO2a and MO3a while the rotor is designated MORa. SR1a and SR3a are resistances in circuit with the stator windings of the hoisting motor. The car door contacts are designated GSa while the hoistway door contacts are designated DSa. The door operating motor is illustrated as a three-phase squirrel cage induction motor. The stator windings of this motor are designated DM1a, DM2a and DM3a while the rotor is designated DMRa. DSR1a and DSR3a designate resistances in circuit with the stator windings of the door operating motor.

A double blade emergency stop switch ES1a and ES2a is provided in the car. The contacts of the various safety devices are indicated by the legend "safeties." Terminal limit switches are designated UPLa and DNLa. Limit switches operated by the door operating mechanism are designated DOL1a, DCL1a, DCL2a and DOL2a. DZLa is a door zone limit switch carried by the car and closed by cams (not shown) in the hoistway, one at each floor. MCCa is a switch responsive to the load in the elevator car. Other resistances employed in the control system are designated generally as Ra. Condensers utilized are designated generally as COa. The electromagnetic switches are illustrated in deenergized position. Also, all latching switches are illustrated in reset condition.

Assume that car $a$ is idle at the main floor, the selector for car $a$ being illustrated for this condition. Assume also that emergency stop switch ES1a, ES2a for car $a$ is closed and that emergency stop switch ES1b, ES2b for car $b$ is open. Under such conditions switch TGa is operated and switch TGb is not. Thus contacts TG2a are engaged, completing the circuit for the coil of starting relay FCa. This circuit extends through contacts FC3b which are engaged because switch FCb is not operated due to the fact that contacts TG2b are separated. Thus switch FCa is operated. As car $a$ is idle, its first floor hoistway door and car door are closed, thus door contacts DSa and car door contacts GSa are engaged.

Assume now that an intending passenger at the third floor presses up third floor landing button UB3. This completes the circuit for the operating coil of up third floor relay 3U. The third floor relay operates to separate contacts 3U1 and to engage contacts 3U2, 3U3a and 3U3b which remain in this condition after the push button is released. Contacts 3U3a complete a circuit for the coils of relays LUa and AUa, this circuit being through contacts GH2a, Z2a and FC2a, resistance R8a, contacts 3U3a, switches FH3a, FH4a and FHTa, coils LUa and AUa and contacts BD3a. Relay LUa operates, separating contacts LU2a to render auxiliary reset brush DHRa ineffective for up car travel. It also engages contacts LU6a to establish a holding circuit for the coils of relays LUa and AUa. Relay AUa operates separating interlock contacts AU3a in the circuit for the coil of relays BDa and LDa. It also engages contact AU1a, completing a circuit by way of contacts DZ2a and Z1a for the coil of stopping relay Sa. Relay Sa operates, engaging contacts S1a to complete a circuit for the coil of relay SXa. Relay SXa operates, completing a circuit for the coils of switches Aa and Pa, this circuit being through these coils, contacts B1a, up limit switch UPLa, contacts LU1a and SX1a, door contacts DSa and GSa and emergency stop switch ES2a. Switch Aa operates, separating interlock contacts A2a in the circuit for the coil of switch Ba'. It also separates contacts A3a, rendering brushes DHSa and DCSa ineffective for up car travel. It also engages contacts A5a and A6a, preparing the circuits for the stator windings of the elevator hoisting motor for a phase rotation of applied voltage for up direction of car travel. Switch Pa operates, engaging contacts P5a and P6a to complete the circuit for the stator windings of the hoisting motor. At the same time contacts P2a and P3a and contacts A4a complete the circuit for the brake release coil BRa. As a result the brake is released and the car is started in the up direction.

Upon release of the brake, contacts BR1a separate to insert resistance R16a in circuit with the brake release coil. The engagement of contacts P3a and contacts A4a also completes a circuit for the coils of switch Ka and relay DLa. Relay DLa operates, engaging contacts DL3a to complete a circuit for the coil of relay DRa. Relay DRa operates, engaging contacts DR3a to establish a self-holding circuit. It also engages contacts DR1a but contacts DL2a are now separated, preventing the completion of a circuit for the coils of switches DOa and DZa. Relay DLa also engages contacts DL1a to complete a circuit for the coil of time relay Za. Relay Za operates, separating contacts Z2a but this is without effect as they are now by-passed by contacts LU6a. Relay Za also separates contacts Z1a, breaking the circuit for the operating coil of relay S. This relay is of the same type as the floor relays, remaining in operated condition when the circuit for its operating coil is broken. Switch Pa also separates contacts P1a to break the circuit for the auxiliary reset brushes during running of the car.

Switch Ka does not operate immediately the circuit for its operating coil is completed, being delayed as by a dash pot. Upon operation it engages contacts K2a and K4a, short circuiting resistances SR1a and SR3a in circuit with the stator windings of the hoisting motor to increase the torque for full speed operation.

As the car nears the third floor, up brush UHSa engages stationary contact UP3a, completing a circuit for the reset coil of stopping relay Sa through resistance R5a, contacts B3a and BP1a, brush UHSa, contact UP3a and contacts 3U2 and reset coil of the up third floor relay 3U. The voltage thus applied to the reset coil of the floor relay is not sufficient to reset this relay.

This voltage, however, is sufficient to cause the resetting of the stopping relay. As a result contacts S1a separate, breaking the circuit for the coil of relay SXa. Also, contacts S2a engage, increasing the voltage applied to the reset coil of the up third floor relay 3U, causing this relay to be reset and thus automatically cancelling the call. At the same time that brush UHSa engages contact UP3a, the insulating up section of cam FDCa moves into engagement with the third floor direction switch FH3a to break the circuit for the coils of relays AUa and LUa, causing these relays to drop out. As a result contacts LU1a separate which along with the separation of contacts SX1a breaks the initial energizing circuit for the coils of switch Aa and switch Pa. These coils are maintained energized, however, through contacts A1a and up stop switch USSa. As the car arrives at a certain distance from the third floor, up stop switch USSa is opened to break the circuit for the coils of switches Aa and Pa with the result that the circuits for the stator windings of the elevator hoisting motor are broken and the brake release coil BRa is deenergized and the brake applied to bring the car to a stop at the third floor.

The separation of contacts A4a and P3a as the car is brought to a stop breaks the circuit for the coils of switch Ka and relay DLa. Relay DLa upon dropping out engages contacts DL2a to complete a circuit through door zone limit switch DZLa now closed and contacts DR1a for the coil of relay DZa and also for the coil of switch DOa through limit switch DOL1a. The door open switch DOa engages contacts DO2a and DO3a to energize the stator windings of the door operating motor to open the car door and third floor hoistway door. The door reopen relay DZa engages contacts DZ1a to by-pass contacts DL1a and thus maintain time relay Za operated. As the doors start to open, limit switch DCL2a closes to complete the circuit for the coil of relay GHa. Thus relay GHa is operated while the doors are out of open position.

As the doors reach open position, limit switches DOL1a and DOL2a open. The opening of limit switch DOL1a breaks the circuit for the coil of door open switch DOa and the opening of limit switch DOL2a breaks the circuit for the coil of door relay DRa, causing these switches to drop out. The dropping out of switch DOa breaks the circuit for the door operating motor. The dropping out of relay DRa breaks the circuit for the coil of door reopen relay DZa, causing this relay to drop out. The dropping out of relay DZa breaks the circuit for the coil of time relay Za. This relay is delayed in dropping out by the discharge of condenser CO4a to provide time for the passenger to enter the car, press a car button for his desired destination and thus determine the direction of car travel.

Assume that the intending passenger at the third floor desires to be carried to the fourth floor and that he enters the car and presses fourth floor car button CB4a. This completes the circuit for the operating coil of the car button fourth floor relay 4Ca which operates and latches itself in operated condition. The resultant engagement of contacts 4C2a completes a circuit by way of contacts K1a and direction switches FH4a and FHTa for the coils of relays LUa and AUa. Also, the pressing of the fourth floor car button completes a circuit for the coil of relay CCa. Relay CCa operates, engaging contacts CC1a to complete a circuit by way of contacts DZ2a and DR2a and limit switch DCL1a (now closed) for the coil of door close switch DCa. This switch operates, engaging contacts DC1a to complete a circuit for the coil of relay CTa. This relay, in turn, engages contacts CT1a to establish a holding circuit for the coil of switch DCa. Switch DCa also engages contacts DC2a and DC3a to establish a circuit for the stator windings of the door operating motor to effect the closure of the doors. As the doors reach closed position, switch DCL1a opens, causing the dropping out of switch DCa. Also, the engagement of contacts CC1a completes a circuit for the operating coil of stopping relay Sa through contacts AU1a. Thus, upon the closure of the doors and consequent engagement of door contacts DSa and GSa, a circuit is completed by way of contacts LU1a and SX1a for the coils of switches Pa and Aa. These switches operate as before to effect the starting of the car in the up direction. The circuit for the coils of relays LUa and AUa is held through contacts LU3a after the separation of contacts K1a.

As the car nears the fourth floor, up brush UCSa engages stationary contact CP4a to complete a circuit for the reset coil of stopping relay Sa, causing this relay to be reset. As a result, the fourth floor car call is automatically cancelled and the car is slowed down and brought to a stop at the fourth floor as previously described. Also, relays LUa and AUa are dropped out as the result of the engagement of the upper section of cam FDCa with switch FH4a. Also, the fourth floor hoistway door and car door are automatically opened incident to the stopping operation. As the doors reach open position the circuit for the coil of time relay Za is broken. This relay as above pointed out is delayed in dropping out to provide time for the passenger to leave the car. If, when the time interval of this relay has expired, no calls remain to be answered, the reengagement of contacts Z1a establishes a circuit for the coil of door close switch DCa to cause operation of this switch to effect the reclosing of the doors.

If a push button is pressed which requires travel of the car in a down direction in order to respond thereto, the car is started in the down direction and slowed down and stopped at the landing for which the push button is provided. It is not believed necessary to describe this operation in detail as it is believed that it will be understood from the above description of operation of the car in the up direction. For starting the car in the down direction, relays BDa and LDa and switch Ba are operated instead of relays AUa and LUa and switch Aa. The circuit for the coil of relays LDa and BDa is initiated by way of contacts GH2a, Z2a and FC2a in case of landing calls above the main floor and by way of contacts TG3b and BA2b in case of a landing call at the main floor or basement. If the car is started down in response to a down landing call, the car is caused to slow down and stop at the floor for which the call is registered as a result of the engagement of brush DHSa with the stationary contact DPa for that floor. If the car is started down in response to car call, the car is caused to slow down and stop at the floor for which the call is registered as a result of the engagement of brush DCSa with the stationary contact CPa for that floor.

The car is slowed down and stopped in response to a down landing call during up car travel and in response to an up landing call during down car travel under conditions where no circuits are set up which require the car to travel beyond the floor at which the button is located. Assume, for example, that with the car at the main floor an intending passenger at the second floor desires to be carried to the first floor and presses down second floor landing button BD2. This causes down second floor relay 2D to operate and latch itself in operated condition. The resultant engagement of contacts 2D3a completes a circuit for relays LUa and AUa to cause the starting of the car in the up direction. As the car nears the second floor, the upper insulating section of cam FDCa opens switch FH2a and, as no call is registered for a floor above, this breaks the circuit for the coils of relays LUa and AUa, causing these relays to drop out. The resultant separation of contacts LU1a causes the car to be slowed down and brought to a stop at the second floor. As the car is brought to a stop at the second floor and the doors start to open, contacts GH1a engage completing a circuit by way of contacts DZ4a, resistor R1a, contacts P1a, LU2a and BP3a, brush DHRa, contact DP2a and contacts 2D2 for the reset coil of relay 2D, automatically cancelling the down second floor call.

The system operates in a similar manner to start the car in the down direction in response to the pressing of an up landing button for a floor below the car and to stop the car, while travelling in the down direction, at the floor for which the landing button is located, under conditions where no circuits are set up for causing the car to travel below that floor.

In each of the above examples, it was assumed that only one button was pressed. The system also operates to stop the car at each floor at which a button was pressed in the event that more than one button was pressed, thus giving "collective" push button operation. This stopping is in the natural order of floors in each direction of travel, regardless of the order in which the buttons are pressed. Assume that the car has been started in the up direction from the main floor in response to a fourth floor car call and that, before the engagement of brush UHSa with stationary contact UP3a, up third floor landing button UB3 is pressed to cause registration of a third floor up call and thus render contact UP3a alive. Engagement of this brush and contact causes reset of stopping relay Sa to cause slowing down and stopping of the car at the third floor and the automatic cancellation of the third floor call. The doors automatically open as the car is brought to a stop. For convenience, it will be assumed that no passenger enters the car. Upon expiration of the time delay provided by relay Za, contacts Z1a engage to cause operation of the door close switch DCa to close the doors. As the doors reach closed position, the engagement of door contacts DSa and GSa causes operation of switches Pa and Aa to start the car in the up direction. Contacts LU1a in the initial energizing circuit for the coils of switches Pa and Aa are engaged because of the fourth floor car call that is registered and contacts SX1a are engaged because of the operation of relay Sa upon engagement of contacts Z1a.

The car is not stopped on its upward trip in response to an intervening down landing call as the fourth floor car call maintains relays LUa and AUa operated upon the engagement of the up insulating section of cam FDCa with switch FHa for the floor for which such intervening down call is registered. Upon the engagement of brush UCSa with the contact CP4a as the car nears the fourth floor, the car is caused to slow down and stop at that landing and the fourth floor car call is reset in the manner previously described.

It will be seen from the above description, that, when the car is travelling in the up direction, stops are made in response to up landing buttons and car buttons in the natural order of floors regardless of the order in which the buttons are pressed. A stop is also made in response to a down landing button, provided no push button for a floor above remains to be responded to. So long as a car button or a landing button for a floor above has been pressed before the reset of the floor relay for the floor at which the stop is about to be made, a circuit is maintained for the coils of relays LUa and AUa, thereby causing the car to restart in the up direction after the transfer of passengers has been effected and the doors reclosed. It is believed that it would be understood without further detailed description that when the car is travelling in the down direction, stops are made in response to all down landing buttons and car buttons in the natural order of floors, regardless of the order in which the buttons are pressed. A stop is also made in response to an up landing button, provided no push button for a floor below remains to be responded to.

A push button at a floor may be pressed more than once before the car is brought to a stop in response thereto at the floor at which the button is located. Such repressing of the button may occur after the floor relay for that button has been reset incident to the answering of the call. A floor relay operated in response to such late pressed push button is again reset by means of brushes UHRa and DHRa, brush UHRa serving for up car travel and brush DHRa for down car travel. The reset circuit is established upon the opening of the doors as the car is brought to a stop and is through contacts GH1a, DZ4a, resistor R1a, contacts P1a, BP3a and either LU2a or LD2a.

It may happen that a push button may be pressed at the floor at which the car is standing idle with the doors closed. Under such conditions, the pressing of the button effects the reopening of the doors by causing operation of relay HOa. The circuit for the coil of this relay is through one of the pairs of contacts HL1a, FC1a and HL2b, depending upon operating conditions as will be seen from later descriptions, and thence by way of resistor R1a, contacts P1a, BP3a and either contacts LD2a, brush UHRa, contact UPa for the floor at which the car is standing, and contacts U2 and reset coil of up floor relay U for that floor, or through contacts LU2a, brush DHRa, contact DPa for that floor and contacts D2 and reset coil of down floor relay D for that floor. Relay HOa upon operation, engages contacts HO1a to complete a circuit for the coils of relay DZa and switch DOa. Switch DOa causes the opening of the doors while relay DZa engages contacts DZ4a which together with the engagement of contacts GH1a as the doors start to open causes sufficient current to be supplied to the reset coil of the floor relay to cause this relay to be reset. Also, relay DZa completes the circuit for the coil of relay Za to reestablish the time interval.

So far the operation of only one elevator has been described. Referring to Figure 2b as well as to Figures 2a and 3a, the operation of two elevators under "duplex" control will be described. For such operation the emergency stop switches ES for both cars are closed. For purposes of the present description, assume that cut-out switches CU1, CU2 and CU3 for both cars are closed, that cut-out switches CU4 and CU5 are open and that cut-out switches CU6, CU7 and CU8 for both cars are open. The circuits are illustrated for the home station at the main floor, that is the lobby floor which with one basement floor as illustrated is the first floor.

The operation of car $a$ in response to a landing button has previously been described. The operation of this car in response to a car button pressed by the passenger who registered the landing call also has been described. Descriptions of these operations will not be repeated. After stopping at the floor for which the car button was pressed, the car remains at that floor, assuming no other push buttons pressed. Car $a$ thus becomes the free car. If while the car is idle at that floor a landing button for another floor is pressed, the car is started in operation and caused to answer the call registered by that landing button, regardless of whether it be an up or a down button and regardless of the floor at which the button is located. This car continues to answer the landing calls that are registered, so long as these calls are not behind the car, operating as a busy car. The other car, car $b$ under the assumed conditions, which is idle at the home station acts, so far as landing buttons are concerned, as a stand-by car ready to help out the busy car. It also serves to receive passengers at the home station to carry them to their destinations. A car waiting at the home station is therefore the home station car.

When a car is operating as a busy car and has a direction of travel established, the registration of a call behind the busy car causes the home station car to be started in operation to assist the busy car. By "call behind" is meant that if the busy car has its direction set for upward travel, an up call for a floor above the home station is a call behind that car when its registration occurs after the disengagement of brush switch UCB for that car from its stationary contact UCC for the floor for which such call is registered. If the call registered under such conditions be a down call, it is not classed as a call behind because the busy car is still in a position to answer this call upon its subsequent travel in the down direction. Should the busy car's direction be set for down, then either an up or a down call for a floor above the home station is a call behind when registered after the disengagement of the upper section of cam FDC for the busy car from its switch FH for the corresponding floor. A previously registered up call for a floor above the home station becomes a call behind, under conditions where one or more buttons have been pressed for floors below the one for which the up call is registered, as soon as the upper section of cam FDC for the busy car disengages switch FH for the corresponding floor during downward travel of the car. A call is not a call behind a car when the car is standing at a floor and its direction of travel is not set as the car may leave the floor in the proper direction to answer the call.

A home station car is started in operation in response to a car call for that car for a floor above, regardless of whether or not it is behind the other car in operation. The registration of such a call causes energization of the coils of relays LU and AU for that car by way of contacts K1 for that car. This starts the car in the up direction. Inasmuch as this has been previously described it will not be repeated and the description will be confined to starting a second car in operation in response to a landing call behind the busy car.

With car $a$ positioned at the home station, the coil of up call below switch UC$a$ is energized by way of contact UCC1$a$, the brush arm of switch UCB$a$ and contacts TG1$a$. Assume that car $a$ is started in the up direction from the home station in response to a call for the fifth floor. As the car is moved up the hoistway, switch UC$a$ is maintained operated between floors by way of holding contacts UC1$a$ and switch UCB$a$ and at the floors by way of stationary contact UCC$a$ for that floor and the brush arm of switch UCB$a$. Assume now that after the disengagement of switch UCB$a$ from stationary contact UCC3$a$, the up third floor landing button UB3 is pressed. This causes operation of the up third floor relay 3U which separates contacts 3U1. Thus, upon the engagement of switch UCB$a$ with stationary contact UCC4$a$ for the fourth floor, the circuit for the coil of switch UC$a$ is broken. As a result, contacts UC2$a$ engage, completing a circuit by way of contacts TG2$b$ and LU4$a$ and cut-out switch CU2$b$ for the coil of starting relay FC$b$, causing this relay to operate. Assuming that car $b$ is idle at the home station and is thus the home station car, the engagement of contacts FC2$b$ as a result of the operation of relay FC$b$ completes a circuit by way of contacts GH2$b$ and Z2$b$, resistance R8$b$, contacts 3U3$b$, switches FH3$b$, FH4$b$ and FHT$b$ and contacts BD3$b$ for the coils of relays LU$b$ and AU$b$. This causes car $b$ to be started in the up direction in a manner similar to that described for starting car $a$ in the up direction from the main floor.

Assume again that car $b$ is the home station car, standing idle at the main floor. Assume now that car $a$ is traveling downwardly and that, after it has passed the third floor, either the up button or the down button at that floor is pressed. The resultant engagement of contacts 3U3$a$ or 3D3$a$ completes a circuit by way of contacts GH2$a$, Z2$a$ and FC2$a$, resistance R8$a$, switches FH3$a$, FH4$a$ and FHT$a$, and contacts LD3$a$ for the coil of pass call switch PC$a$. This switch operates, engaging contacts PC1$a$ to complete a circuit through contacts TG2$b$ and switch CU2$b$ for the coil of relay FC$b$. This relay operates as above described to cause the starting of car $b$ in the up direction.

Assume again that car $b$ is standing idle at the home station. Assume now that car $a$ is a free car, standing idle at some intermediate floor. The pressing of an up button at a floor below car $a$ but above the home station does not cause the starting of car $b$ as contacts LU4$a$ are separated, preventing the completion of a circuit for the coil of relay FC$b$ upon the engagement of contacts UC2$a$. Instead, car $a$ is started in the down direction to respond to the call. Also, the pressing of either an up button or a down button at a floor above idle car $a$ does not cause the starting of car $b$ as contacts LD3$a$ are separated, preventing the completion of the circuit for the coil of switch PC$a$ and thus not causing the operation of relay FC$b$. Instead, car $a$ is started in the up direction to respond to the call. In addition, the pressing of either an up button or a down button at the floor at which car *a* is standing idle does not cause the starting of car *b* due to contacts LU4a and LD3a being separated and also due to the fact that switch UCa is not operated under such conditions and that switch FHa for that floor is open. Also, the fact that switch UCa is not operated prevents the starting of car *b* in response to an up call for a floor at which car *a* is positioned under conditions when car *a* is set for upward travel, and the fact that switch FHa for the floor at which car *a* is positioned is open prevents the starting of car *b* in response to either an up call or a down call at that floor when car *a* is set for downward travel. The pressing of a down button at the floor at which car *a* is positioned or at a floor below when car *a* is set for upward travel does not cause car *b* to start as such call does not control switch UCa.

Once car *b* is started in operation, it is stopped in response to calls in a manner similar to that described for car *a*. Initiation of stopping in response to car calls during up car travel is effected by the engagement of brush UCSb with contacts CPb for the floors for which such calls are registered and during down car travel is effected by the engagement of brush DCSb with contacts CPb for the floors for which such calls are registered. The initiation of the stopping of car *b* in response to up landing calls is effected in response to the engagement of brush UHSb with stationary contacts UPb for the floors for which such calls are registered. The initiation of the stopping of car *b* in response to down landing calls is effected in response to the engagement of brush DHSb with stationary contacts DPb for the floors for which such calls are registered. Car *b* may be stopped in its upward travel in response to a down landing call when no call affecting that car remains to be responded to for a floor above the floor for which the down call is registered. Similarly, it may be stopped in its downward travel in response to an up landing call when no call affecting that car remains to be responded to for a floor below the floor for which the up call is registered. Such stops are initiated by the engagement of the upper section of cam FDCb with switch FHb for that floor, as described for car *a*.

With both cars in operation, the car which stops at a floor for which a landing call is registered is the car travelling in the proper direction whose call pick-up brush (UHS or DHS) for that direction of travel first engages its stationary contact for the floor for which the call is registered or, in case of a call for the direction opposite to car travel, whose upper section of cam FDC first engages its switch FH for that floor. When both cars are responding to calls, both may be regarded as busy cars. The car which is thereafter returned to the home station is determined by operating conditions. Starting a car on its automatic return to the home station is effected by establishing a home station return circuit for that car. The home station return circuit for car *a*, for example, is by way of contacts TT3a, BX2b and FC5a, resistance R12a, switch FHla and switches FHa below the car, lower section of cam FDCa, coils of relays LDa and BDa and contacts AU3a. The purpose of contacts TT3a and BX2b will be explained later and for the present it will be assumed that these contacts are in engagement. When car *a* reaches its highest call, it loses its up direction set up with the result that contacts LU5a separate. If there be no call behind car *b* to maintain the coil of relay FCa energized, the separation of contacts LU5a breaks the circuit for the coil of relay FCa. Relay FCa drops out to engage contacts FC5a, completing the home station return circuit for car *a*. Assuming car *a* returns to the home station, the engagement of the upper section of cam FDCa with switch FHla as it nears the home station causes the car to be brought to a stop at that floor. Also upon the dropping out of relay FCa, contacts FC3a engage to maintain relay FCb operated. Thus, upon car *b* answering its last call, its home station return circuit is not completed and the car remains at the floor at which such stop is made.

Should a car call for a car on its automatic return to the home station be in registration for a floor between the car and the home station, the car is automatically stopped at that floor as a result of the engagement of brush DCS for that car with its contact CP for that floor. Upon the discharge of the passenger and expiration of the time interval, contacts Z1a engage and the car automatically resumes its trip to the home station. Similarly, should a down landing call be registered for a floor between the car and the home station, the car is stopped at that floor as a result of the engagement of brush DHS for that car with its contact DP for that floor and automatically resumes its trip upon the expiration of the time interval. Should a landing call be registered which is behind the busy car and no call be registered for a floor below the car no call be registered for a floor below the car returning to the home station, the automatic return of the car to the home station is interrupted and the car returns to the assistance of the other car. For example, with car *a* on its automatic return to the home station and car *b* set for upward travel, the registration of an up landing call below car *b* causes the engagement of contacts UC2b, completing a circuit for the coil of relay FCa. Relay FCa operates, separating contacts FC5a, breaking the automatic home station return circuit for car *a*. If the up call be above car *a* and no car call for car *a* for a floor below the car or landing call for such floor is in registration, relays LDa and BDa drop out, causing the car to be brought to a stop at the next floor, the direction changed to up upon expiration of the time interval and the consequent starting of the car in the up direction. If the up call be below car *a*, the circuit for the coils of relays LDa and BDa is maintained by way of contacts LD5a and the up floor relay contacts, and the car continues its downward travel and stops at the floor for which the up call is registered, provided no car call for car *a* for a floor below a landing call for such floor is in registration. With car *b* set for downward travel, the registration of a landing call above car *b* causes the operation of switch PCb and thus the operation of relay FCa to break the home station return circuit for car *a* and the car to respond to this call as above explained. In case in the above examples a landing call is registered for a floor below, the circuit for the coils of relays LDa and BDa is maintained by way of contacts LD5a in case of a call above the home station and by way of contacts LD7a in case of a call at the home station.

Thus, in accordance with the arrangement illustrated, a car is at the home station to serve incoming traffic as much as conditions permit. Should a passenger enter the home station car and press a car button for a floor above, the other car, if a free car, is automatically started on its return to the home station. Assuming car $a$ is an idle free car, the starting of car $b$ in the up direction completes a circuit by way of contacts TG2$b$, LU5$b$ and BA1$b$ for the coil of relay FC$b$. This relay operates, separating contacts FC3$b$, breaking the circuit for the coil of relay FC$a$. This relay drops out, engaging contacts FC5$a$ to complete the home station return circuit for car $a$. Should, with car $b$ idle at the home station, car $a$ travel to the home station in response to a car call, upon the arrival of the car the engagement of brush HLB$a$ with stationary contact HLC$a$ completes a circuit through contacts S4$a$ for the coil of home landing relay HL$a$. This relay operates, engaging contacts HL3$a$ to complete a circuit through contacts P4$a$ for the coil of relay FC$b$. As a result contacts FC3$b$ separate, breaking the circuit for the coil of relay FC$a$ which drops out to engage contacts FC3$a$ and thus maintain the coil of relay FC$b$ energized after the separation of contacts P4$a$. Thus car $a$ becomes the home station car and car $b$ the free car. As contacts HL1$a$, HL2$a$, HL1$b$ and HL2$b$ are all separated with both cars at the home station, only the doors of the selected free car will be automatically opened to receive passengers upon the pressing of a landing button at the first floor, as contacts FC1 for the other car are not in engagement.

The home station car responds to landing calls at the basement. For example, if car $a$ is the home station car, its contacts FC4$a$ are in engagement. Thus, upon the pressing of button UBB, the resultant engagement of contacts BU3$a$ completes a circuit for the coils of relays LD$a$ and BD$a$, causing the starting of the car in the down direction. Had car $b$ been at the basement at that time, the coil of basement switch BA$b$ would be energized by way of brush HLB$b$ and contact BLC$b$. Thus contacts BA2$b$ would be separated, preventing the establishment of the circuit for the coils of relays LD$a$ and BD$a$. Thus car $a$ is not started but instead relay HO$b$ is operated to cause the opening of the doors for car $b$. When the home station car is started on a trip to the basement, the other car is not automatically returned to the home station as relay FC for the car going to the basement is not operated. When the passenger entering the car, say car $a$, at the basement presses the first floor car button, relay FC$a$ is not operated. This is effected by delaying the dropping out of switch BA$a$ by the discharge of condenser CO3$a$ after brush HLB$a$ leaves contact BLC$a$ for a time sufficient for the call to be answered. This maintains contacts BA1$a$ separated and thus prevents the establishment of the circuit for the coil of relay FC$a$. Thus car $b$, if a free car, is not returned to the home landing. However, if the car button pressed is for a floor above the home landing, contacts BA1$a$ reengage to establish the circuit for the coil of relay FC$a$ after the car passes the first floor and if car $b$ be idle, the resultant separation of contacts FC3$a$ breaks the circuit for the coil of relay FC$b$, causing the automatic return of car $b$ to the home station to become the home station car.

So far, the description of duplex operation has been restricted to assumptions where, upon the registration of a landing call behind the busy car, the some station car is started in operation to assist the busy car or the automatic return of the other car to the home station is interrupted. However, especially when traffic is heavy, there may be several landing calls awaiting answering, yet none of them is behind the busy car. Under such conditions, the home station car is brought into operation or the return of a car to the home station is interrupted, provided there has been continuous landing call registration for a predetermined period of time. This is effected through the control of landing call relay HC. This relay has contacts HC1 which control the circuit for the coil of transfer timing relay TT. So long as no landing call is registered, the coil of relay HC is energized by way of the series circuit back contacts U1 and D1 of the landing button floor relays. Thus contacts HC1 are engaged and relay TT is operated. As soon as a landing call is registered, relay HC drops out breaking the circuit for the coil of relay TT. This relay does not drop out until the expiration of a certain time interval, say thirty seconds, being delayed by the discharge of condenser CO2. Thus if relay HC remains deenergized and thus contacts HC1 remain separated for the duration of this interval, relay TT drops out. Relay HC may be maintained deenergized by different calls, so long as these calls overlap, i. e., are answered under conditions where another landing call is unanswered. These calls have no relation to the positions of the cars as the separation of any of the landing button floor relay contacts in the series circuit is effective to prevent the energization of relay HC.

The dropping out of relay TT as a result of continuous call registration for a given period causes for each elevator the separation of contacts TT3 and the engagement of contacts TT1 and TT2. Assume for example that car $a$ is idle at the home station, none of the landing calls which caused the dropping out of relay TT having been behind car $b$. The engagement of contacts TT1$a$ by-passes contacts FC2$a$ to complete a circuit for the coils of relays LU$a$ and AU$a$, causing the starting of car $a$ in the up direction. As before, car $a$ becomes a busy car, assisting car $b$ in answering landing calls and also responding to car calls registered by its incoming passengers. When call conditions permit, one of the cars is automatically returned to the home station as previously described.

Should the above described continuous call registration condition arise while a car, say car $a$, is on its automatic return to the home station, the separation of contacts TT3$a$ breaks the home station return circuit, causing that car, if no car call for that car or a landing call exists for a floor below the car, to stop at the next floor and restart in the up direction to assist car $b$. Should such call below exist, the car, after answering the lowermost call and provided contacts TT3$a$ are then separated, restarts in the up direction. Should the continuous call registration condition exist when a car reaches its highest call, the separation of contacts TT3 for that car prevents the establishment of the automatic home station return circuit for that car. Contacts TT2$a$ enable a car, say car $a$, above the home station, whether idle or busy, to be brought to the home station or basement in response to a landing call at that floor under conditions when the other car at the home station or basement fails to respond to such call within the time interval.

Thus a home station car is brought into operation, or the automatic return of a car to the home station is prevented or interrupted, under conditions where there has been continuous registration for a predetermined period of a landing call or of overlapping landing calls. However, should at any time during this period all landing calls have been picked up, relay HC is reoperated, engaging contacts HC1 and thus reestablishing the circuit for the coil of relay TT. Thus the home station car is not started in operation, or, if a car is on its return to the home station, its automatic home station return circuit is not broken.

Should a busy car become filled to a certain percent, say 80%, of capacity its by-pass switch is operated to cause it to automatically by-pass landing calls until room is again provided by the discharge of passengers. Referring for example to the circuits for car $a$, when the car in taking on passengers becomes loaded to the percentage of capacity for which the system is adjusted, load switch MCC$a$ is closed. This switch may be arranged beneath the car platform to be actuated by relative movement of the cab in the car framework. A suitable arrangement is disclosed in the copending application of Bruns and Galanty, Serial Number 166,937, filed June 8, 1950. With switch MCC$a$ closed, upon the engagement of contacts CT2$a$ incident to the closing of the doors, a circuit is completed for the coil of by-pass switch BP$a$. This switch is of the latching type similar to the floor relays and upon operation latches itself in operated condition. As the doors reach closed position, relay CT$a$ is dropped out by the separation of contacts DC1$a$, causing the separation of contacts CT2$a$ to prevent unwanted operation of switch BP$a$ as a result of the starting or running of the car. Switch BP$a$ upon operation separates contacts BP1$a$ and BP2$a$ to prevent the picking up of landing calls, thereby providing "automatic load non-stop operation." It also separates contacts BP3$a$ to prevent the pressing of the landing button at that floor for the direction in which the car is set for travel causing the reopening of the doors. Upon the stopping of the car in response to a car call, incident to the door opening operation, contacts DO1$a$ engage to complete a circuit through contacts BP4$a$ for the reset coil of switch BP causing this switch to be reset. Thus a load weighing operation takes place upon each stop to determine whether or not there is room in the car for further passengers and thus whether stops are to be made in response to landing calls.

Switch BP$a$ upon operation also causes the engagement of contacts BP5$a$, completing a circuit through contacts TG2$b$ and CU3$b$ for the coil of relay BX$b$. Thus, if car $b$ be idle at the home station, the operation of relay BX$b$, engaging contacts BX1$b$ to by-pass contacts FC2$b$ causes car $b$ to start in operation to assist car $a$ provided a landing call is in registration to enable the up direction circuit to be completed. If car $b$ is on its automatic return to the home station at that time, its automtic home station return circuit is interrupted by the separation of contacts BX2$a$, provided a landing call is in registration to cause contacts HC2$b$ to be separated, causing car $b$ to return to the assistance of car $a$ in the manner previously described. If contacts BX2$a$ and HC2$b$ are separated at the time that car $b$ reaches its highest call, they prevent the completion of the automatic home station return circuit for car $b$. Should car $b$ be the busy car and should its bypass switch BP$b$ be operated, car $a$ if not already a busy car is caused to come to the assistance of car $b$ in the manner above described. Thus, even though all the unanswered landing calls are ahead of a busy car, the operation of the by-pass switch for that car brings the other car to its assistance. This may be termed automatic by-pass control.

Certain of the above described arrangements for controlling the bringing of a car to the assistance of a busy car may be employed alone or in combination with other such arrangements, depending upon the requirements of the particular installation. This has been illustrated for convenience as effected by means of cut-out switches and while in certain instances such cut-out switches may be employed, as where it is desired to change the type of operation of an installation, it is to be understood that in installations where certain of such control arrangements are not employed the circuits for effecting such control would not be provided and other circuit modifications may be involved.

For example, an installation may be arranged so that another car is brought to the assistance of a busy car only in the event of continuous call registration. Such operation may be had, disregarding cut-out switches CU1 for the moment, by opening all the other cut-out switches for both cars. With switches CU2 for both cars open calls behind the busy car have the same weight as other calls and there must be continuous call registration for the prescribed period to bring a car to the assistance of a busy car, regardless of whether the calls be ahead of or behind the busy car. To combine continuous call registration control with call behind control, cut-out switches CU2 for both cars are closed. If it be desired to provide call behind control alone, switches CU2 for both cars and preferably switch CU4 are closed. With switch CU4 closed, the coil of relay TT is reenergized upon each start of a car, by way of contacts K3$b$ in case of the starting of car $b$ and contacts K5$a$ in case of the starting of car $a$. Thus with a landing call to be responded to, should the busy car fail to start for the prescribed period, the home station car is brought into operation as a result of the engagement of contacts TT1 for that car. However, if desired, the timing feature can be omitted entirely by closing switch CU5, thus maintaining relay TT energized.

An installation may be arranged so that another car is brought to the assistance of a busy car only in the event that the busy car becomes sufficiently loaded to cause it to by-pass landing calls. Such operation may be had by closing only switches CU1 and CU3 for both cars and either switch CU4 or CU5. Under such conditions, the duration of call registration or the relation of the calls to the busy car have no control of the other car. However, whenever switch BP for a busy car operates to render it ineffective to respond to landing calls, contacts BP5 for that car engage, completing a circuit for switch BX for the other car. If switch BX for the other car is not already operated, the operation of this switch causes the starting of that car from the home station or the interrupting of its home station return circuit as previously described. To combine automatic by-pass control with call behind control, switches CU1, CU2 and CU3 for both cars and either switch CU4 or CU5 are closed. To combine automatic load by-pass control with continuous call registration control, only switches CU1 and CU3 for both elevators are closed. To include also call behind control, switches CU2 for both elevators are also closed. It may be desired to retain the automatic load by-pass feature for each car without controlling the starting or automatic home station return of the other car by this by-pass operation. This can be effected by opening switches CU3 for both cars with switches CU1 for both cars closed.

If it be desired to have each car, once started on its automatic return to the home station, continue to the home station notwithstanding continuous call registration, switch CU6 for each car is closed to by-pass contacts TT3 for that car. If it be desired to have each car, once started on its automatic return to the home station, continue to the home station notwithstanding the conditioning of the other car to by-pass landing calls, switch CU7 for each car is closed to by-pass contacts BX2 for that car. If it be desired to have each car, once started on its automatic return to the home station, continue to the home station notwithstanding the registration of calls behind the other car, switches CU8 for both cars are closed. In the case of car $a$, for example, the closing of switch CU8$a$ completes a by-pass circuit around contacts FC5$a$, provided the car is set for downward travel with its contacts LD8$a$ engaged and car $b$ has its relay FC$b$ operated engaging contacts FC6$b$.

Reference may now be had to Figures 5$a$, 6$a$, 5$b$, 6$b$, 5$c$ and 6$c$ where certain of the circuits for controlling a three car installation are shown. Figure 5$a$ shows the landing call registering circuits common to the elevators. Figures 5$a$, 5$b$ and 5$c$ show for each elevator the car call registering circuits, call pick-up and automatic call cancelling circuits, direction, home landing, starting and highest call circuits and circuits for bringing the cars to the assistance of each other. Figures 6$a$, 6$b$ and 6$c$ show for each elevator car reversal and car selection circuits, by-pass and continuous call circuits and further direction and starting circuits. Each elevator is provided with further circuits which may be as shown in Figure 3$a$. The elevators will be designated $a$, $b$ and $c$.

The electromagnetic switches employed in the circuits of Figures 5 and 6 have been designated as follows:

A, Up reversing switch
AS, Starting switch relay
AU, Up reversing switch relay
B, Down reversing switch
BA, Basement switch
BD, Down reversing switch relay
BP, By-pass switch
CBH, Call behind switch
CC, Car button relay
CDN, Down car relay
CK, Car call switch
CT, Reverse resistance relay
CUP, Up car relay
DHC, Down landing call switch
DO, Door open switch
DZ, Door reopen relay
FC, Starting relay
GH, Auxiliary door closing relay
GW, Car door contact switch
HD, Down landing call switch
HL, Home landing relay
HLR, Home landing return switch
HO, Landing reopening relay
HU, Up landing call switch
LD, Down auxiliary reversing switch relay
LUD, Up and down relay
LU, Up auxiliary reversing switch relay
P, Main line switch
RC, Car reversal switch
S, Stopping relay
SC, Selection switch
SX, Auxiliary stopping relay TG, Transfer switch
TGX, In service switch
TT, Transfer timing relay
TX, Fail to start relay
UC, Up call below switch
UHC, Up landing call switch
XTT, Call ahead switch
Z, Time relay Each selector has car and landing call pick-up and reset contacts and brushes, up call below contacts and brush switch, direction switches and cam and home landing and basement contacts and brush, as in the duplex arrangement of Figures 2$a$ and 2$b$. In addition, each selector has stationary contacts designated HUC and cooperating brush switches HUB and HUBA in up landing call starting circuits and stationary contacts HDC and cooperating brush switches HDB and HDBA in down landing call starting circuits. Brushes HUBA and HDBA are advance brushes. An advance brush UCBA is also provided in the circuit for controlling switch UC of each elevator. The corresponding stationary contacts HUC, HDC and UCC of the selector for each elevator are cross connected by wire WHU, WHD and WUC respectively.

Assume all cars at the home station, i. e., the first floor. As a result the home landing relay HL for each car is operated, the circuit for its coil being completed by way of brush HLB and stationary contact HLC for that car. Operation of one car, say car $a$, first will be described. For this condition emergency switch ES$a$ for car $a$ is closed and emergency switches ES$b$ and ES$c$ for cars $b$ and $c$ are opened. With switches ES$b$ and ES$c$ open, switches TG$b$, TG$c$, TGX$b$ and TGX$c$ are deenergized. As a consequence, the circuit for the coil of starting switch relay AS is completed through contacts LD2$a$, FC1$a$, TG3$b$ and TG3$c$. Also car $a$ selection switch SC$a$ is operated, the circuit for its coil being completed through contacts HL2$a$, SC4$c$ and SC2$b$. Switch SC$a$ upon operation engages contacts SC2$a$ to establish a self-holding circuit. As a result of the operation of relay AS and switch SC$a$, a circuit is completed by way of contacts SC7$a$ and AS1$a$ for the coil of starting relay FC$a$. Relay FC$a$ upon operation separates contacts FC1$a$ to break the circuit for the coil of relay AS causing this relay to drop out. The resultant separation of contacts AS1$a$ is without effect, however, as relay FC$a$ has established a self-holding circuit by way of contacts HL5$a$, SC6$a$ and FC2$a$.

With car $a$ standing at the home station, up landing call switch HU$a$ is operated, the circuit for its coil extending through contacts TD2, 4D3, 4U3, 3D3, 3U3, 2D3 and 2U3, contact HUC1$a$, and the brush arm of switch HUB$a$. Upon the registration of an up landing call, say at the fourth floor, contacts 4U3 separate to break the circuit for the coil of switch HU$a$. Switch HU$a$ drops out, engaging contacts HU3$a$ to complete a circuit through contacts GW2$a$, closed because the doors are closed and thus switch GW$a$ is operated because its coil circuit is completed by way of car door contacts GS$a$, contacts Z3$a$, closed because the time limit has expired, contacts FC8$a$, BD6$a$ and B8$a$ for the coil of relay AU$a$ and through these contacts and contacts LD5$a$ for the coil of relay LU$a$. These relays operate to cause the starting of the car in the up direction as described for duplex operation.

Should a down landing call for a floor above instead of an up call have been registered, say a down call at the third floor, the resultant separation in contacts 3D3 breaks the circuit for the coil of switch HU*a* to cause the starting of the car in the up direction. Should a passenger enter the car and press a car button, say button CB4*a*, the resultant engagement of contacts 4C2*a* completes a circuit through the coil of switch CK and by way of switches FH4*a* and FHT*a* for the coil of up car relay CUP*a*. This relay operates, engaging contacts CUP1*a* to complete a circuit for the coils of relays AU*a* and LU*a* to start the car in the up direction. Inasmuch as the car has been assumed to be standing idle at the home station with the doors closed, the passenger, in order to enter the car and register the car call, effects the opening of the doors by pressing the up button UB1 at that landing. This completes a circuit by way of contacts SC5*a* for coil of relay HO*a*, causing the opening of the doors for car *a* as described for duplex operation. Also the engagement of contacts GH1*a* and DZ4*a* incident to the operation of relay HO*a* causes the operated first floor relay to be reset.

Had car *a* been standing idle at a floor above the home station, say the top floor, and a call be registered for a floor below, the car is started in the down direction. This is effected in case of a car call by causing the operation of down car relay CDN*a*. Assume that a car call is registered for the third floor, the circuit for the coil of relay CDN*a* is through contacts 3C2*a*, switch FH3*a*, the brush arm of switch FH4*a* and the lower section of cam FDC*a*. Switch CDN*a* engages contacts CDN1*a* to complete a circuit through contacts AU6*a* and A8*a* for the coil of relay BD*a* and through these contacts and contacts LU5*a* for the coil of relay LD*a*. These relays operate to cause the starting of the car in the down direction. Should an up landing call for a floor below, say for the third floor, be registered instead of the car call, the starting of the car in the down direction is effected through the control of switch UC*a*. With the car standing at the top floor with no up calls registered, the circuit for the coil of switch UC*a* is completed by way of contacts 2U2, 3U2 and 4U2, stationary contact UCCT*a* and the brush arm of switch UCB*a*. Registration of the third floor up call causes the separation of contacts 3U2 to break the circuit for the coil of switch UC*a*. This switch drops out, engaging contacts UC5*a* to complete a circuit by way of contacts GW3*a*, Z4*a* and FC9*a* and by way of contacts AU6*a* as above described for the coils of relays BD*a* and LD*a*. Had a down landing call been registered instead of an up call, the car is started in the down direction through the control of down landing call switch HD*a*. With the car standing at the top floor, a circuit for the coil of switch HD*a* is completed through contacts 2D2, 3D2 and 4D2, stationary contact HDCT*a* and the brush arm of switch HDB*a*. Upon the registration of the down call, say for the third floor, the separation of contacts 3D2 breaks the circuit for the coil of switch HD*a*. This switch drops out, engaging contacts HD3*a* to complete a circuit for the coils of relays BD*a* and LD*a* to start the car in the down direction. Contacts HU4*a* maintain switch HU*a* operated during travel of the car until a call is in registration for a floor above. Contacts UC4*a* maintain switch UC operated during car travel until a call is in registration for a floor below. Contacts HD4*a* serve a similar purpose for switch HD*a*. When either of relays LU*a* or LD*a* is operated it engages contacts LU4*a* or LD6*a* to cause the operation of relay LUD. Relay LUD by its contacts LUD1*a* and LUD3*a* maintain the direction set up until the car has completed its trip in the direction in which it has been travelling.

The stopping of the car in response to car calls and landing calls is effected in the same manner as described under duplex operation and will not be repeated. However, in case of stopping in response to a down call going up, the direction circuit is broken as a result of the completion of the circuit for the coil of switch HU*a* by the engagement of advance brush switch HUBA*a* with its stationary contact for the floor for which the down call is registered. Similarly, on stopping on an up call going down, the direction circuit is broken as a result of the completion of the circuit for the coil of switch UC*a* by the engagement of advance brush switch UCBA*a* with its stationary contact for the floor for which the up call is registered.

The operation of three elevators will now be described. For such operation the emergency stop switches ES for all three cars are closed. Assume again that the three cars are standing idle at the home landing and that car *a* has been selected. Assume further that car *a* is started in the up direction in response to a call. As car *a* leaves the first floor and brush HLB*a* runs off contact HLC*a*, home landing relay HL*a* is dropped out. As a result a circuit is completed for the coil of elevator *b* selection switch SC*b* through contacts HL1*b*, HL1*a*, SC1*a* and SC1*c*. Switch SC*b* operates, engaging contacts SC1*b* to establish a self-holding circuit and separating contacts SC2*b* to break the circuit for the coil of switch SC*a*, contacts SC1*b* engaging before contacts SC2*b* separate. Thus, switch SC*b* is operated selecting car *b* as the one to be brought to the assistance of car *a* when conditions warrant.

As car *a* leaves the first floor, contacts HL5*a* separate but the circuit for the coil of switch FC*a* is maintained through contacts LU2*a* and BA1*a*. Also contacts HL6*a* engage, establishing another circuit through contacts FC3*b* and FC4*c* for the coil of switch FC*a*. So long as cars *b* and *c* remain at the home station, this latter circuit maintains switch FC*a* operated, regardless of its direction of travel and whether the car is idle. Car *a* thus serves as the busy car and when all calls are responded to, it remains at the floor at which the last stop is made. Car *b* is started in operation in response to a car call, a landing call behind car *a*, continuous landing call registration ahead of car *a* or an automatic by-pass operation for car *a*. As to car calls, it is believed that this operation will be understood from previous description. It is to be noted that the pressing of the up landing button UB1 at the home station to gain access to a car causes the doors for the selected car (in this case car *b*) to open. This is due to the fact that contacts SC5*b* are engaged.

As regards operation when a landing call behind is registered, assume that car *a* is set for upward travel, is above the third floor and that a third floor up call is registered. The resultant separation of contacts 3U2 causes the dropping out of switch UC*a* upon the engagement of either of switches UCB*a* or UCBA*a* with a stationary contact above contacts 3U2. Switch UC*a* thereupon engages contacts UC2*a*, completing a circuit through contacts TGX2*a* and LU3*a* for the coil of call behind switch CBH*a*. Switch CBH*a* operates, separating contacts CBH1*a* to break the circuit for the coil of switch TG*a*. Switch TG*a* drops out, engaging contacts TG3a to complete a circuit by way of contacts LD2b, FC1b, LD2c and FC1c for the coil of relay AS. Relay AS operates to engage contacts AS1b, completing a circuit for the coil of relay FCb. Relay FCb operates to establish a self-holding circuit and to break the circuit for the coil of relay AS as described for elevator a. Inasmuch as one or more landing calls are in registration for floors above car b, switch HUb is deenergized and contacts HU3b are engaged. Thus the engagement of contacts FC8b upon operation of relay FCb completes a circuit for the coils of relays AUb and LUb, causing the starting of car b in the up direction.

As contacts FC3b are now separated, the circuit for the coil of relay FCa is maintained through contacts LU2a and BA1a while car a is set for upward travel. Similarly, as contacts FC4a are separated, the circuit for the coil of relay FCb is maintained through contacts LU2b and BA1b while car b is set for upward travel. As a result of the dropping out of relay HLb as car b leaves the main floor, contacts HL2b are engaged, completing a circuit for the coil of elevator c selection switch SCc through contacts HL2c, HL2b, SC3b and SC3a. Switch SCc operates to establish a self-holding circuit and to break the circuit for the coil of switch SCb as described for car a.

Assuming again that car b is idle at the home landing and has been selected, it is started in operation in response to either an up call or a down call for a floor above car a set for downward travel. Assume that car a is below the fourth floor and that a landing call is registered for the fourth floor. The resultant separation of contacts 4U3 or 4D3, depending upon which call is registered, causes dropping out of switch HUa upon the engagement of either of switches HUBa or HUBAa with a stationary contact for a floor below. Switch HUa thereupon engages contacts HU2a to complete the circuit through contacts TGX2a and LD4a for the coil of switch CBHa. Switch CBHa operates as above described to cause the operation of relay AS and thus the operation of relay FCb. Inasmuch as contacts HU3b are now engaged, due to the fact that a call is in registration above car b, the engagement of contacts FC8b completes a circuit for the coils of relays AUb and LUb to start car b in the up direction.

With car b idle at the home landing and selected, the registration of an up call below car a set for downward travel does not start car b in operation as this call may be answered by car a on its downward trip. However, should a call be registered for a floor below for which the up call is registered, as soon as it is determined that car a cannot answer this call because of another call below, i. e., as soon as car a passes the floor for which the up call is registered, switch HUa is dropped out, causing the operation of switch CBHa, thus causing the starting of car b from the home landing.

Assume now that both cars a and b are busy cars set for travel in the up direction, that car c is idle at the home landing and is selected and that an up call is registered for a floor below car a, the higher of the two busy cars. If this up call is not also below car b, car c is not started as switch UCb remains operated and no circuit is completed for the coil of switch CBHb. Therefore, contacts CBH1b are engaged so that switch TGb is operated and a circuit is not completed for the coil of relay AS. However, if the up call is below both cars a and b, both of switches UCa and UCb are dropped out as above described. This causes the operation of both of switches CBHa and CBHb, thereby effecting the dropping out of both of switches TGa and TGb. Thus contacts TG3a and contacts TG3b are engaged, completing a circuit by way of contacts LD2c and FC1c for the coil of relay AS. Relay AS operates to cause the operation of relay FCc, as described for cars a and b. Relay FCc engages contacts FC8c completing a circuit for the coils of relays AUc and LUc owing to the fact that contacts HU3c are engaged as a result of the call being above car c. Thus car c is started in the up direction to assist cars a and b.

Assume now that both cars a and b are set for travel in the down direction and that car c is idle at the home landing and is selected. Assume further that either an up call of a down call is registered for a floor above both cars. As a result, both switches HUa and HUb are dropped out, causing the operation of both switches CBHa and CBHb so that the circuits for the coils of both of switches TGa and TGb are broken, thus completing the circuit for the coil of relay AS through contacts LD2c and FC1c, causing car c to start in operation to assist cars a and b. If a down call is registered above one car, say car a, but below the other car, car b, car c is not started because, while switch HUa is dropped out as a result of the call being behind car a, switch HUb is not dropped out as the call is ahead of car b. Although a circuit is completed by way of contacts HU2a for the coil of switch CBHa, a circuit is not completed for the coil of switch CBHb as contacts HU2b remain separated. Thus contacts CBH1b remain engaged, maintaining switch TGb operated and thus preventing the completion of a circuit for the coil of relay AS so that car c is not started. Instead, the call is responded to by car b on its downward trip. If in the last example the call had been an up call instead of a down call, car c is started in operation if car b is on its return to the home station, as will be seen from later description. If not on its return to the home station, car c is started in operation if car b passes the call.

It is believed that it will be seen without detailed explanation that if one car, say car a, is set for downward travel and the other car, car b, is set for upward travel, and a down call is registered for a floor above, the call is not effective to start car c as it is ahead of car b. Neither is an up call above car a effective to start car c if this call is also above car b as the call is ahead of car b. However, an up call above car a but below car b is effective to start car c because it is behind both cars. This is effected by causing the dropping out of switch HUa which engages contacts HU2a to cause the operation of switch CBHa and by causing the dropping out of switch UCb which engages contacts UC2b to cause the operation of switch CBHb. Also an up call below both cars is effective to start car c as will be explained later.

Assume now that car a is a free car, idle at some floor above the home landing, that cars b and c are idle home landing cars, that car b has been selected and that car b is started in response to the pressing of a car button for the floor above. Under such conditions relay FCb is operated as a result of the engagement of contacts LU2b incident to starting the car in the up direction. The resultant separation of contacts FC3b breaks the circuit for the coil of relay FCa inasmuch as contacts S4a, HL5a, LU2a, RC4a and AS1a are all separated under the assumed conditions. Thus relay FCa drops out causing the engagement of contact FC7a to complete a circuit for the coil of relay CDNa by way of contacts Z2a, GW1a, CK1a, the coil of switch HLRa, switch FH1a and corresponding switches for floors above to the lower section of cam FDCa. Relay CDNa engages contacts CDN1a completing a circuit for the coils of relays BDa and LDa to start car $a$ in the down direction. The circuit thus completed for the coil of relay CDNa is the automatic home station return circuit for car $a$ and causes the return of car $a$ to replace car $b$, now the busy car. Car $c$ is selected as the next to leave upon the departure of car $b$ as previously described.

Assume that cars $b$ and $c$ are idle at the home station and that a passenger enters car $a$ and presses the first floor car button CB1a. This causes car $a$ to go to the home station. As the car arrives there, contacts HL6a separate, and as contacts SC6a are separated, this causes the dropping out of relay FCa. Relay FCa engages contacts FC1a to complete a circuit for the coil of relay AS. This relay operates, engaging contacts AS1b and, assuming that car $b$ is the selected car, thus completing a circuit for the coil of relay FCb. This relay operates to cause car $b$ to become the free car and car $a$ becomes a home station car.

It is to be noted that when two or more cars are in operation set for upward travel, the first car to lose its up direction set-up causes by the separation of contacts LU2 for that car the dropping out of relay FC for that car. This relay engages contacts FC7 to complete the automatic home station return circuit for that car. For example, should only two cars remain in operation, say cars $a$ and $b$, and both be set for upward travel with only one landing call remaining to be responded to above both cars, the car which answers the call, say car $a$, causes the dropping out of relay FCa by the separation of contacts LU2a. As a result of the reset of the floor relay in automatically cancelling the call, relay LUb also drops out causing car $b$ to be brought to a stop at the next floor. The separation of contacts LU2b does not drop out relay FCb at this time as this circuit is now completed by way of contacts FC3c, FC4a and HL6b. However, upon a passenger entering car $a$ and pressing a button for a floor above, relay LUa is reoperated causing through the engagement of contacts LU2a the reoperation of relay FCa. Relay FCa separates contacts FC4a which, as contacts LU2b are separated, breaks the circuit for the coil of relay FCb. Thus relay FCb drops out to engage contacts FC7b to establish the automatic home station return circuit for car $b$. However, should the passenger who entered car $a$ press a car button for a floor below, relay LUa is not operated so that upon the expiration of the time delay and the closure of the doors the automatic home station return circuit for car $a$ is completed by way of contacts Z2a, GW1a and FC7a. Car $b$, therefore, remains at the floor at which the stop is made and becomes the free car.

Should a car call for a car on its automatic return to the home station be in registration for a floor between the car and the home station, the car is automatically stopped at that floor as a result of the engagement of brush DCS for that car with its contact CP for that floor. Upon the discharge of the passenger and expiration of the time period, the car automatically resumes its return to the home station. Similarly, should a down landing call be registered for a floor between the car and the home station, the car is stopped at that floor as a result of the engagement of brush DHS for that car with its contact DP for that floor and automatically resumes its trip upon the expiration of the time interval. Should one car, say car $c$, be at the home station at the time another of the cars, say car $b$, is on its automatic return to the home station, the registration of a call behind the third car, car $a$, does not interrupt the home station return circuit for car $b$. If such call be a down call below car $b$ it will be picked up by car $b$ on its way down. If it be an up call or a down call above car $b$, car $c$ is started in operation. Also, if the call be an up call below car $b$, car $c$ is started in operation. This is due to the fact that contacts HLR2b are engaged as a result of the operation of home landing return switch HLRb, the coil of which is in the home station return circuit for car $b$. Thus the engagement of contacts UC2b upon the registration of an up call below car $b$ completes the circuit for the coil of switch CBHb, causing the starting of car $c$ as above explained. Thus in a previous example where car $a$ is set for downward travel and car $b$ is set for upward travel and an up call is registered below both cars, car $c$ is started in operation because a circuit is completed for the coil of switch CBHb through contacts LU3b and UC2b and a circuit is completed for the coil of switch CBHa through contacts HLR2a and contacts UC2a.

Assume that three cars are in operation with one of them, say car $a$, on its return to the home station and that a call is registered which is behind the other two cars. As explained above, this call causes the stopping of car $a$ on its downward trip if the call be a down call for a floor below the car. If the call be either an up call or a down call above car $a$, and assuming that no car call for car $a$ is registered for a floor below car $a$ and that neither an up call or a down call is registered below car $a$, the home station return circuit for car $a$ is interrupted, the car is stopped at the next floor and it is started in the up direction to respond to the call. This is effected through the control of car reversal switch RCa. Since the call is behind both of cars $b$ and $c$, both of switches CBHb and CBHc are operated. This causes both switch TGb and switch TGc to be dropped out, engaging contacts TG1b and TG1c. Since there is neither an up call nor a down call registered below car $a$, both switches UCa and HDa are operated, engaging contacts UC1a and HD1a. Thus a circuit is completed by way of contacts TG1b, TG1c, HLR1a, UC1a, HD1a, RC1b, RC1c, TX1a and TGX1a for the coil of switch RCa. Switch RCa engages contacts RC4a to cause operation of switch FCa which in turn separates contacts FC7a to break the home station return circuit for car $a$. Thus, if there be no car call for car $a$ for a floor below, the circuit for the coil of relay CDNa is broken and the car is stopped at the next floor. Also, as contacts FC8a are engaged, the car is started in the up direction upon the expiration of the time interval. Switch RCa also engages contacts RC1a to establish a self-holding circuit and separates contacts RC2a and RC3a to prevent operation of switches RCb and RCc. The holding circuit is subject to contacts P1a and SX2a to insure time for another circuit to be established for the coil of switch FCa through contacts LU2a before contacts RC4a separate. Should two cars, say cars a and b, be on their return to the home station and a call be registered behind car c under conditions where there is no call below either of cars a and b, the first switch RC to operate, say switch RCa, separates contact RC2a to prevent the operation of switch RCb. Thus the home station return circuit for only one of the cars is interrupted.

The selected car at the home station responds to landing calls at the basement. For example, if car a is the selected car at the home station, its contacts SC8a are in engagement. Thus, upon the pressing of button UBB, the resultant engagement of contacts BU2a completes a circuit by way of contacts Z2a, GW1a, BA2b and BA3c for the coil of relay CDNa, causing the starting of the car in the down direction. Contacts LUD2a maintain the direction set-up both on basement operation and in the case of an automatic return to the home landing. Incident to the starting operation, contacts LD3a engage to complete a momentary circuit for the coil of basement switch BAa. This switch operates and is delayed in dropping out by the discharge of condenser CO3a after brush HLBa leaves contacts HLCa to effect the separation of contacts HL3a, thus maintaining contacts BA2a and BA3a separated to prevent the establishment of a basement circuit by either of the other cars. Had either of the other cars been at the basement when button UBB was pressed, contacts BA2b in case it be car b or contacts BA3c in case it be car c, prevent the establishment of the basement circuit for car a. Instead relay HO for the car at the basement is operated to effect the opening of the doors for that car. When car a starts for the basement, under the previous assumption, another car, say car b, at the home station is selected, a circuit being established for the coil of switch SCb by way of contacts HL1b, HL1a, SC1a, SC1c. Switch SCb upon operation causes car a to lose its selection as previously described.

When a passenger enters the car, say car a, at the basement, and presses the first floor car button, relay FCa is not operated due to the delay in dropping out of switch BAa as described for duplex operation, and thus the delay in engagement of contacts BA1a. Thus the free car is not returned to the home station. However, if the car button is pressed for a floor above the home landing, contacts BA1a engage to establish the circuit for the coil of relay FCa after the car passes the first floor. Thus if the free car is idle, the resultant separation of contacts FC3a or FC4a, depending upon which of cars b and c is the free car, breaks the circuit for the coil of relay FC for the free car, causing its return to the home station. Where two elevators, say elevators b and c, are out of service, i. e., have their emergency switches ES open, switches TGXb and TGXc are dropped out and contacts TGX3b and TGX4c are engaged. These contacts by-pass contacts BA2b, BA3c and SC8a, causing elevator a to serve the basement as a simplex elevator.

A free car is not returned to the home station as a result of the pressing of a landing button at the home station as neither of relays 1U and 1D has contacts in the circuits controlling switches UC and HD. However, if a car, say car a, is on its automatic return to the home station and a call is registered behind the other two cars, the return of the car to the home station is not interrupted if a landing call is in registration for the home station as the circuit for the coil of relay CDNa is maintained through either contacts 1U2a or 1D3a when the automatic home landing return circuit is broken by the separation of contacts FC7a. Contacts BU2a act in a similar manner to maintain the circuit under conditions where a basement landing call is in registration.

When there has been continuous landing call registration ahead of a busy car for a certain period of time, the selected home station car is started in operation to assist the busy car. This is effected through the control of switch XTT and relay TT for each car. Assume that cut-out switch CU11 for each elevator is open and that car a is the busy car and is set for upward travel. The registration of either an up landing call or a down landing call above car a causes the dropping out of switch HUa which separates contacts HU1a. Similarly, the registration of a down landing call below car a causes the dropping out of switch HDa to separate contacts HD2a. Contacts HU1a are by-passed by contacts BD5a when the car is set for downward travel, thus the separation of contacts HU1a during up car travel or the separation of contacts HD2a initiates a call ahead of car a. The separation of either contacts HU1a during up car travel or of contacts HD2a breaks the circuit for the coil of call ahead switch XTTa. As car a is the busy car and is away from the home landing, its contacts FC5a and HL7a are separated so that the separation of contacts XTT2a as switch XTTa drops out breaks the circuit for the coil of transfer timing relay TTa. This relay does not drop out until the expiration of a certain time interval, say 30 seconds, being delayed by the discharge of condenser CO2a. Thus if the circuit for the coil of switch XTTa and thus the circuit for the coil of relay TTa is maintained broken for this time interval as a result of the separation of contacts HU1a or contacts HD2a or a combination of them, relay TTa drops out. Switches HUa and HDa may be maintained deenergized by different calls, so long as these calls overlap.

The dropping out of relay TTa as a result of continuous call registration ahead of car a for a given period of time causes the separation of contacts TT1a to break the circuit for the coil of switch TGa. Switch TGa drops out to engage contacts TG3a, completing a circuit through contacts LD2b, FC1b, LD2c and FC1c for the coil of relay AS. Assuming car b the selected car, the engagement of contacts AS1b as relay AS operates completes a circuit through contacts SC7b for the coil of relay FCb, causing the starting of car b in operation to assist car a as previously described.

It is to be noted that under the above assumed conditions where car a is the busy car and cars b and c are at the home station, the registered landing calls are not effective to control relays TTb and TTc as contacts FC5b and FC5c and contacts HL7b and HL7c are engaged. However, as soon as relay FCb is operated as a result of the dropping out of relay TTa or as a result of any other call condition which causes the operation of relay FCb, contacts FC5b separate to render the landing calls effective through switch XTTb to control relay TTb. Thus, upon the starting of car b in operation to assist car a, the timing interval provided by relay TTb cannot start until contacts FC5b separate incident to starting car b in operation. Also, the timing interval for relay TTa is restarted as a result of the engagement of contacts AS2a. Switch XTTb is controlled by landing calls ahead of car b as described for car $a$. Thus, should there thereafter be continuous registration of landing calls ahead of car $b$ and continuous registration of landing calls ahead of car $a$ for the given period, relays TT$b$ and TT$a$ are dropped out, causing the engagement of contacts TG3$b$ and TG3$a$ to cause the operation of relay AS and thus the starting of car $c$ in operation to assist cars $a$ and $b$. Whenever there is a down call registered above the home landing, switch DHC is deenergized. Contacts DHC2 of this switch for each elevator and contacts AU5 for that elevator prevent the reoperation of switch XTT for that elevator as the car in its upward travel passes a floor at which a down call is registered.

Should two cars, say cars $a$ and $b$ be in operation and one of them, say car $b$, on its automatic return to the home station, the continuous registration of one or more landing calls ahead of car $a$ and the continuous registration of one or more landing calls ahead of car $b$ for the given period causes relays TT$a$ and TT$b$ to be dropped out. This causes the engagement of contacts TG3$a$ and TG3$b$ as above explained to cause the operation of relay AS thus starting car $c$ in operation. If all three cars are in operation with one of them, say car $a$, on its automatic return to the home station, the continuous registration of one or more landing calls ahead of each of cars $b$ and $c$ for the given period causes relays TT$b$ and TT$c$ to be dropped out thus the dropping out of switches TG$b$ and TG$c$. This causes the engagement of contacts TG1$b$ and TG1$c$ which, if there is neither an up call nor a down call registered below car $a$, completes a circuit for the coil of switch RC$a$ as previously explained. Switch RC$a$ engages contacts RC4$a$ to cause the operation of switch FC$a$ to break the home station return circuit for car $a$. If there is no car call for car $a$ for a floor below, the circuit for the coil of relay CDN$a$ is broken, the car is stopped at the next floor and is restarted in the up direction at the expiration of the time interval to assist cars $b$ and $c$.

Should a busy car become filled to a certain percent of capacity, its by-pass switch BP is operated, as explained for duplex operation. Assume that, with cars $b$ and $c$ at the home station, by-pass switch BP$a$ for car $a$ is operated. If one or more calls are registered ahead of car $a$ so that contacts XTT1$a$ are separated, the separation of contacts BP4$a$ as a result of the operation of switch BP$a$ breaks the circuit for the coil of switch TG$a$ which drops out to engage contacts TG3$a$ to cause the starting of the selected car from the home station. If only one car, say car $c$ remains at the home station, the operation of the by-pass switches for cars $a$ and $b$ causes, if calls are in registration ahead of each of these cars, the dropping out of switches TG$a$ and TG$b$ and thus, the starting of car $c$ in operation. If all three cars are in operation with one of them, say car $a$, on its automatic return to the home station, the operation of the by-pass switches for cars $b$ and $c$ causes, if calls are in registration ahead of each of these cars, the dropping out of switches TG$b$ and TG$c$ to engage contacts TG1$b$ and TG1$c$. Thus, if there is neither an up call nor a down call registered below car $a$, a circuit is completed for the coil of switch RC$a$. This switch operates, as previously explained, to cause breaking of the home station return circuit for car $a$ so that if there is no car call for car $a$ for a floor below, the car is stopped at the next floor and is restarted in the up direction to assist cars $b$ and $c$.

So far, the operation of the elevators under "triplex" control has been described for the condition where there has been a call registered behind one or more cars, or where there has been continuous call registration ahead of one or more cars, or where there has been by-pass operation by one or more cars. When two cars are in operation, the starting of the third car from the home station to assist the other cars may be effected by a combination of these circumstances. For example, assume cars $a$ and $b$ to be in operation and car $c$ at the home station and that a call is registered behind car $a$. If this call is not also behind car $b$, it will not cause the starting of car $c$ by causing the dropping out of switch CBH$b$. However, if there be continuous registration of one or more overlapping calls ahead of car $b$, in combination with a call behind car $a$, car $c$ is started in operation. This is effected by the separation of contacts CBH1$a$ to drop out switch TG$a$ and by the separation of contacts TT1$b$ to drop out switch TG$b$. Also, if there is a by-pass operation by car $b$, the call behind car $a$ being ahead of car $b$, in combination with the call behind car $a$, causes car $c$ to be started in operation. This is effected by the separation of contacts BP4$b$ and XTT1$b$ to drop out switch TG$b$ in combination with the dropping out of switch TG$a$ as above explained. Similarly, the combination of a by-pass operation for car $b$ with a call ahead of car $b$ in combination with continuous call registration of one call or a plurality of overlapping calls ahead of car $a$ causes the starting of car $c$. Thus it is seen that any of the following: a call behind one car, a by-pass operation for one car with a call ahead of that car, or continuous call registration for a given period of a call or a plurality of calls in overlapping relation ahead of such car; in combination with any of the following: a call behind another car; a by-pass operation for such other car with a call ahead of that car, or continuous call registration for a given period of a call or a plurality of calls in overlapping relation ahead of such other car, will start a third car in operation from the home station. Also any of these combinations will interrupt the return of the third car to the home station if no call exists for a floor below the third car.

The system may be arranged to operate without the call behind control, the continuous call registration control or the by-pass control. The by-pass control may be cut out by closing cut-out switch CU10 for each elevator. The continuous call registration control may be cut out by closing cut-out switch CU11 for each elevator. The call behind control may be cut out by opening cut-out switch CU15 for each elevator. When the call behind control is cut out it is preferred to render switch XTT for each elevator subject to any landing call whether ahead of or behind the car. This may be done by opening cut-out switches CU13 and CU14 for each elevator. The opening of switch CU13 renders contacts HU1 for that elevator effective for both directions of travel and the opening of switch CU14 renders contacts UC3 for that elevator effective so that an up call below also affects switch XTT for that car.

The circuits are also arranged so that if a car fails to start within a certain time when conditions arise which dictates the starting of the car, switch TG for that car is dropped out to cause the starting of another car. The arising of conditions dictating the starting of a car is indicated by the operation of either relay AU or relay BD for that car. The failure of the car to start is indicated by the failure to operate of switch P for that car. Thus taking car $a$ for example, if either relay $AUa$ or relay $BDa$ is operated and switch $Pa$ is not operated, the attendant separation of contacts $BD4a$ or contacts $AU4a$ and of contacts $PU9a$ in parallel therewith breaks the circuit for the coil of relay $TXa$. This switch does not drop out immediately, being delayed for a certain time interval by the discharge of condenser $CO7a$. If the circuit remains broken for the duration of the interval, relay $TXa$ drops out separating contacts $TX1a$ and $TX2a$. Contacts $TX2a$ cause the dropping out of switch $TGa$ to cause the starting of another car as previouly described. Contacts $TX1a$ prevent the operation of switch $RCa$ and thus obviate the possibility of this switch locking out the RC switches for the other elevators by its contacts $RC2a$ and $RC3a$. Arranged in the circuit for the coil of each relay TX, for example relay $TXa$, are contacts $GH2a$ which cause the dropping out of relay $TXa$ if the doors are held open for the predetermined period.

The free car, instead of remaining at the floor at which the last stop in response to a call is made, can if desired be caused to return to a selected floor. This is effected by closing, for each car, cut-out switch CU9. The third floor has been illustrated as the one selected by connecting these cut-out switches to the third floor direction switches FH3 for the respective elevators. Taking the circuits for car $a$ for example, when the car is the free car its contacts $FC6a$ are closed. As no car calls are registered for car $a$, its contacts $CK1a$ are closed and, as no landing calls are registered which this car would answer, contacts $UHC1a$ and $DHC1a$ are closed. Thus, upon the expiration of the time interval and closure of the doors, a circuit is completed through contacts $Z2a$, $GW1a$, $CK1a$, $FC6a$, $UHC1a$ and $DHC1a$, and switch $CU9a$ to the third floor direction switch $FH3a$, and thence through either the coil of relay $CUPa$ or the coil of relay $CDNa$, depending upon whether the car is below or above the third floor. The operation of relay $CUPa$ or relay $CDNa$ causes the starting of the car toward the third floor and as it arrives at the third floor it is brought to a stop.

The functioning of the system as applied to two elevators, as exemplified by Figures $2a$, $2b$ and $3a$, or as applied to more than two elevators, as exemplified by Figures $5a$, $5b$, $6a$ and $6b$ in conjunction with Figure $3a$, might be further illustrated by describing the operations obtained under conditions other than those previously assumed, but it is believed that these operations will be understood from previous description, rendering further description unnecessary.

In reviewing the operation of the control system as applied to two elevators cars, as exemplified by Figures $2a$, $2b$ and $3a$, when both cars are idle, one car is a free car usually standing at some floor other than the home station and the other car is at the home station, although both cars may be at the home station. The hoistway door for each car at the floor at which the car is standing and the car door for each car are closed.

Upon the pressing of a landing button at a floor other than the one at which the free car is positioned, the car is started in a direction toward the floor at which the call is registered and becomes a busy car. As the car arrives at a certain distance from the floor at which the call is registered, it is caused to slow down and finally is brought to a stop when it arrives at the floor landing. The car door and the hoistway door for the floor at which the stop is made are opened incident to the stopping of the car. The intending passenger enters the car and presses the car button for his desired destination. The doors close and the car is started in a direction toward the floor for which the car call is registered. Upon arriving at this floor, the car is brought to a stop and the doors are opened, permitting the passenger to leave the car.

If other calls are registered either by car buttons in that car or by landing buttons for floors in the direction in which the car is set to travel, the car stops at each of these floors for which car calls are registered and for which landing calls for the direction in which the car is set to travel are registered. It continues to travel in the same direction after each stop until it stops at the farthest floor in that direction for which a call is registered. This call may be a car call or it may be a landing call for either direction of travel. The car may then be started in the opposite direction to answer calls. If no calls for the opposite direction are registered, the car remains at the floor at which it is stopped.

The busy car continues to answer the landing calls that are registered until conditions arise which bring the other car into operation. The registration of a landing call behind the busy car, the continuous registration of a landing call or of a plurality of overlapping landing calls for a predetermined period, or the operation of the automatic by-pass for the busy car causes the starting of the home station car. These various control arrangements for starting the other car may be employed singly or in combination with one or more of the others. Since a call behind the free car starts the home station car immediately, when continuous call registration control is used in combination with call behind control, the continuous call registration control is responsive to landing calls ahead of the free car. Each car responds to its own car calls so that the home station car may also be started in operation by a passenger entering the car and registering a car call for his destination. In either case, the car upon starting in operation from the home station answers its own car calls and assists the other car in the answering of the landing calls that are registered.

Either car may be returned to the home station in response to a car call for that floor. Also, when both cars are in operation, a car may be returned to the home station in response to a landing call for that floor. In addition, when both cars are in operation, one of them is automatically returned to the home station when conditions permit. Neither car is automatically returned to the home station when any of the conditions exist which would have started a car in operation from the home station. If none of these conditions exist when a car answers its highest call, the automatic home station return circuit for that car is completed.

If, when a car is being automatically returned to the home station, any of the conditions arise which would have started that car in operation from the home station, the car is caused to return to the assistance of the other car without completing its return to the home station, provided no other call to which this car would respond is in registration for a floor below.

Should the busy car be returned to the home station on a car call under conditions where a car is already at the home station, the home station car becomes the free car and the other car becomes the home station car. With both cars at the home station, should a passenger enter the home station car and press a car button for his destination, the other car becomes the home station car and the car with the car call registered becomes the busy car. Should the free car be idle at some floor other than the home station and a passenger enter the car at the home station and press a car button, the home station car is started in operation and becomes the busy car and the other car is started on its return to the home station. The home station car responds to a call at the basement but this does not cause the return of the free car to the home station. Should a call be registered to which the free car can respond and this car does not start to respond to this call within a predetermined time interval, the car at the home station is started in operation to respond to this call.

In applying the control system to more than two elevator cars, as exemplified by Figures 5a, 5b, 6a and 6b taken in conjunction with Figure 3a, substantially the same operation is had. The operation is altered in certain respects due to the fact that more cars are available. When all cars are idle, one of the cars is a free car standing at some floor other than the home station and the other cars are at the home station.

Upon the registration of a landing call, the free car answers the call. This car continues to answer the landing calls that are registered so long as no condition arises which would start a home station car in operation. When one or more cars are at the home station, one of them is always selected to be the next to respond when a condition arises for starting a home station car in operation. The registration of a landing call behind the busy car causes the selected car at the home station to be started in operation. Also, the continuous registration for a predetermined period of time of a landing call or of a plurality of overlapping landing calls ahead of the busy car or the operation of the automatic by-pass for the busy car under conditions where a landing call is in registration ahead of the busy car causes the starting of the selected home station car in operation. When two cars are in operation, the occurrence with respect to one of these cars of any of the conditions which, if that car were the only car in operation, would start a home station car in operation, i. e., call behind that car, continuous call registration ahead of that car, or by-pass operation by that car with a call ahead, plus the occurrence with respect to the other car of any of such conditions, starts the selected home station car in operation. As in the case of duplex operation, these various control arrangements for starting home station cars in operation may be employed singly or in combination with one or more of the others. A home station car may also be started in operation in response to a car call. In any case, a car upon being started from the home station answers its own car calls and assists the other car or cars in answering landing calls that are registered.

Any car in operation is returned to the home station in response to the registration of its car call for that floor. When two or more cars are in operation, all but one of them are automatically returned to the home station when conditions permit. When a car reaches its highest call, its automatic home station return circuit is completed, provided another car is in operation and not on its return to the home station. If only two cars are in operation, a car that has its home station circuit completed is returned to the home station and the third car is started in operation to assist the other car when conditions warrant. If all cars are in operation, once a car is started on its automatic return to the home station it is caused to continue its travel in the down direction so long as any landing call exists for a floor below or car call for that car exists for a floor below. However, if no such landing call exists, the automatic home station return circuit for a car is interrupted under conditions where that car, if at the home station, would be started in operation, that is under conditions where, with respect to each of the other cars in operation, a call exists behind that car, or there is continuous registration of a call or overlapping calls ahead of that car, or there is an automatic by-pass operation by that car with a call registered ahead of that car.

Should the busy car be returned to the home station on a car call under conditions where both other cars are at the home station, the selected home station car becomes the free car and the car which was the busy car becomes a home station car. Should the free car be idle at some floor other than the home station and a passenger enter the selected car at the home station and press a car button, the selected home station car is started in operation and becomes the busy car and the car which was the free car is started on its return to the home station. The selected home station car responds to the call at the basement but this does not cause the return of the free car to the home station. Should a call be registered to which the free car can respond, and this car does not start to respond to this call within a predetermined time interval, the selected car at the home station is started in operation to respond to this call.

While the invention has been described in connection with a duplex system and a triplex system, it is to be understood that it is applicable to installations of more than three elevators. The invention has been described as applied to an installation having a basement but it is also applicable to installations of more than one basement or to installations with no basement at all. Also, it is contemplated that many of the features of the invention disclosed may be used in connection with apparatus and circuits different from those specifically described and also in connection with other forms of elevator control. Other arrangements for registering calls may be employed. In addition, various alterations may be made. For example, alterations in the control of the hoisting motor may be made such as employing a direct current motor supplied with current from a direct current variable voltage generator. The power supply may be either from direct current or alternating current supply mains. Other forms of control mechanisms may be employed. The system of control disclosed is very complex and admits of many other variations which do not depart from the sprit and scope of the invention. Many apparently widely different embodiments of the invention can be made within the scope of the invention and many different combinations of features discussed may be employed other than those for which specific examples have been given. It is therefore intended that all matter contained in the above description or shown in the accompanying drawings shall be interpreted as illustrative and not in a limiting sense.

What is claimed is:

1. An elevator system comprising; a plurality of elevator cars; a plurality of landings served by the cars; call registering means for each of said landings; means solely responsive to the first call registered for starting one of said cars in operation; and means solely responsive to a continuous demand for service existing for a predetermined interval of time for starting an additional car in operation to assist the first car in meeting the service demand.

2. An elevator system comprising; two elevator cars; a plurality of landings served by the cars; call registering means for each of said landings; means responsive solely to the first call that is registered for starting one of said cars in operation; and means for causing the other car to start in operation solely in response to one or more registered calls, provided there has been continuous registration of such calls over a certain period of time while said one car is responding to calls.

3. An elevator system comprising; a plurality of elevator cars; a plurality of landings served by the cars; call registering means for each of said landings; means for causing the calls that are registered to be answered by the cars that have been started in operation to respond to calls; means for causing one of said cars to be a free car and the other cars to be home station cars; means responsive to the first call that is registered for starting said free car in operation; and means controlled by the time that overlapping calls are registered while said free car is responding to calls for causing a car to start in operation from the home station.

4. An elevator system comprising; a plurality of elevator cars; a plurality of landings served by the cars; call registering means for each of said landings controlled from the landing for which it is provided; a home station; means for causing each of the cars but one to be a home station car and said one car to be a free car; means responsive to the first call that is registered for starting the free car in operation to become a busy car; means responsive to calls ahead of such busy car that are registered, provided there is continuous registration of such calls for a predetermined period of time, for starting a car in operation from the home station to become a busy car; and means for causing the calls that are registered to be answered by said one car when it is the only car in operation but, when a car is started in operation from the home station, for causing such car to assist said one car in answering calls that are registered.

5. An elevator system comprising; a plurality of elevator cars; a plurality of landings served by the cars; call registering means for each of said landings; means for causing one of said cars to respond to the calls that are registered, so long as it is the only car in operation; timing mechanism controlled by unanswered calls that are registered; and means controlled by said timing mechanism for causing a second car to start in operation to assist said one car in answering calls when any unanswered call or a combination of unanswered calls ahead of said one car in overlapping relation has been in continuous registration for a fixed predetermined period of time.

6. An elevator system comprising; a plurality of elevator cars; a plurality of landings served by the cars; call registering means for each of said landings; a home station; means for causing each of the cars but one to be a home station car and said one car to be a free car; means responsive to the first call registered for starting said free car in operation; means controlled by the time that calls are registered for starting a car in operation from said home station when there has been continuous registration for a predetermined period of time; and means for causing the calls that are registered to be answered by said one car when it is the only car in operation but, when a car is started in operation from the home station, for causing such car to assist said one car in answering calls that are registered.

7. An elevator system having more than two elevator cars comprising; a plurality of landings served by the cars; call registering means for each of said landings; means for each of said cars for causing that car when in operation to respond to the calls that are registered; means responsive solely to the first call registered for starting one of said cars in operation; means responsive solely to continuous registration for a given fixed period of time of a call or overlapping calls ahead of said one car for causing a second car to start in operation; and means responsive to continuous registration for an additional given fixed period of time of a call or overlapping calls ahead of both cars for causing a third car to start in operation.

8. An elevator system of more than two elevator cars comprising; a plurality of landings served by the cars; call registering means for each of said landings; a home station for the cars; means for each of said cars for causing that car when in operation to respond to the calls that are registered; means for causing when the cars are idle each of the cars but one to be a home station car and said one car to be a free car; means responsive to the first call registered for starting said free car in operation; and timing mechanism responsive to continuous registration for a given period of time after said free car is started in operation of a call or calls in overlapping relation ahead of said free car for causing a second car to start in operation from the home station and responsive to continuous registration for a given period of time after said second car is started in operation of a call or calls in overlapping relation ahead of both cars for causing a third car to start in operation from the home station.

9. An elevator system having more than two elevator cars comprising; a plurality of landings served by the cars; call registering means for each of said landings; means for each of said cars for causing that car when in operation to respond to the calls that are registered; means for selecting said cars; a home station; means for causing when the cars are idle a selected one of said cars to be a free car and each of the other cars to be home station cars; means responsive to the first call registered for starting said free car in operation; and time controlled means responsive to continuous registration for a given period of time after said free car is started in operation of a call or overlapping calls ahead of said free car for causing a selected home station car to start in operation and responsive to continuous registration for a given period of time after said selected home station car is started in operation of a call or overlapping calls ahead of both said free car and said selected home station car for causing the next selected home station car to start in operation.

10. An elevator system comprising; a plurality of elevator cars; a plurality of landings served by the cars; call registering means for each of said landings; means for causing one of said cars to respond to the calls that are registered, so long as it is the only car in operation; means for causing a second car to start in operation in response to a registered call to assist said one car in answering calls, provided such call is behind said one car; and additional means for causing a second car to start in operation in response to one or more calls ahead of said one car to assist said one car in answering calls, provided there has been continuous registration of such call or of such calls in overlapping relation for a predetermined period of time.

11. An elevator system comprising; a plurality of elevator cars; a plurality of landings served by the cars; call registering means for each of said landings; means for causing one of said cars to respond to the calls that are registered, so long as it is the only car in operation; means for causing a second car to start in operation immediately in response to a registered call behind said one car; and additional means for causing a second car to start in operation in response to one or more calls ahead of said one car upon the expiration of a given time interval after the registration of a call, provided that during such interval there has been continuous registration of such call or of a plurality of calls in overlapping relation.

12. An elevator system comprising; a plurality of elevator cars; a plurality of landings served by the cars; call registering means for each of said landings; means for causing the calls that are registered to be answered by the cars that have been started in operation to respond to calls, means responsive to the first call registered for starting one of said cars in operation; and means for causing a second car to start in operation in response to a registered call behind said one car or to start in operation in response to one or more calls ahead of said one car upon the expiration of a given time interval after the registration of a call, provided there has been continuous call registration during such interval.

13. An elevator system comprising; a plurality of elevator cars; a plurality of landings served by the cars; call registering means for each of said landings; a home station; means for causing each of the cars but one to be a home station car and said one car to be a free car; means responsive to the first call registered for starting said free car in operation; means controlled by the position of said free car with respect to calls for starting a car in operation from said home station in response to a call behind said free car; means controlled by the time that calls are registered for starting a car in operation from said home station when there has been continuous call registration for a predetermined period of time; and means for causing the calls that are registered to be answered by said one car when it is the only car in operation but, when a car is started in operation from the home station, for causing such car to assist said one car in answering calls that are registered.

14. An elevator system comprising; a plurality of elevator cars; a plurality of landings served by the cars; up call registering means for each of said landings; down call registering means for each of said landings; a home station; means for causing each of the cars but one to be a home station car and said one car to be a free car; means responsive to the first call registered for starting said free car in operation; means responsive to an up call below said free car when set for up travel or an up call or a down call above said free car when set for down travel for starting a car in operation from said home station; means responsive to one or more calls, either up calls or down calls or both, ahead of said one car upon the expiration of a given time interval after the registration of a call, provided there has been continuous call registration during such interval, for starting a car in operation from said home station; and means for causing the calls that are registered to be answered by said one car when it is the only car in operation but, when a car is started in operation from the home station, for causing such car to assist said one car in answering calls that are registered.

15. An elevator system comprising; a plurality of elevator cars; a plurality of landings served by the cars; call registering means for each of said landings; a home station; means for each of the cars responsive to registered calls, when that car is in operation, for causing stopping of that car at floors for which such calls are registered; means responsive to the first call registered for starting a selected one of said cars in operation; means controlled by the position of said cars in operation with respect to calls for starting a selected car in operation from said home station in response to a call behind each car in operation; and means controlled by the time that calls are registered for starting a car in operation from said home station when there has been continuous call registration for a predetermined period of time starting not earlier than the time the last to depart car is started from the home station.

16. An elevator system having more than two elevator cars comprising; a plurality of landings served by the cars; call registering means for each of said landings; means for each of said cars for causing that car when in operation to respond to the calls that are regstered; means responsive to the first call registered for starting one of said cars in operation; means responsive to the registration of a call behind said one car or to continuous call registration for a given period of time for causing a second car to start in operation; and means responsive to the registration of a call behind both said one car and said second car or to continuous call registration for another given period of time for causing a third car to start in operation.

17. An elevator system having more than two elevator cars comprising; a plurality of landings served by the cars; call registering means for each of said landings; means for each of said cars for causing that car when in operation to respond to the calls that are registered; means responsive to the first call registered for starting one of said cars in operation; means responsive to a registered call behind said one car or to a call or overlapping calls ahead of that car, provided there has been continuous call registration thereof for a given period of time, for causing a second car to start in operation; and means responsive to the registration of a call behind both said one car and said second car or to a call or overlapping calls ahead of each of such cars in operation, provided there has been continuous call registration thereof for another given period of time, for causing a third car to start in operation.

18. An elevator system having more than two elevator cars comprising; a plurality of landings served by the cars; call registering means for each of said landings; a home station; means for selecting said cars; means for each of the cars responsive to registered calls, when that car is in operation, for causing stopping of that car at floors for which such calls are registered; means responsive to the first call registered for starting a selected one of said cars in operation; means controlled by the position of said cars in operation with respect to calls for starting a selected home station car in operation in response to a registered call behind said selected one car in operation and for starting the next selected home station car in operation in response to a registered call behind both cars in operation; and means controlled by the time that calls are registered for starting a selected home station car in operation in response to continuous call registration for a predetermined period of time after said selected one car is started in operation and for starting the next selected home station car in operation in response to continuous call registration for a predetermined period of time after said first selected home station car is started in operation.

19. An elevator system of more than two elevator cars comprising; a plurality of landings served by the cars; call registering means for each of said landings; a home station for the cars; means for each of said cars for causing that car when in operation to respond to the calls that are registered; means for causing when the cars are idle each of the cars but one to be a home station car and said one car to be a free car; means responsive to the first call registered for starting said free car in operation; means responsive to a registered call behind said free car in operation or responsive to continuous registration for a given period of time after said free car is started in operation of a call or calls in overlapping relation ahead of said free car, for causing a second car to start in operation from the station; and means responsive to a registered call behind both of such cars in operation, responsive to a registered call behind one of such cars in operation and to continuous registration for a given period of time after said second car is started in operation of a call or calls in overlapping relation ahead of the other of such cars in operation, or responsive to the continuous registration for said given period of time of a call or calls in overlapping relation ahead of said free car in operation and of a call or calls in overlapping relation ahead of said second car in operation, for causing a third car to start in operation from the home station.

20. An elevator system comprising; a plurality of elevator cars; a plurality of landings served by the cars; call registering means for each of said landings; a home station for the cars; means for causing when the cars are idle each of said cars but one to be a home station car and said one car to be a free car; means for causing the cars in operation to answer registered calls; a car platform switch for each car operated in response to the load in that car reaching a certain percentage of capacity; means responsive to the first call registered for starting said free car in operation; and means responsive to the operation of said platform switch for said free car in operation when one or more calls are in registration ahead of that car for causing that car to by-pass registered calls and for starting an additional car in operation from the home station.

21. An elevator system having more than two elevator cars comprising; a plurality of landings served by the cars; call registering means for each of said landings; means for each car for causing that car when in operation to respond to registered calls; automatic by-pass means for each car for causing that car to by-pass registered calls; means responsive when the cars are idle to the first call registered for starting one of said cars in operation; and means responsive to the operation of said by-pass means for said one car in operation when a call is in registration ahead of that car for causing the starting of another car in operation and responsive to the operation of said by-pass means for both of said cars in operation when a call is in registration ahead of such cars for causing the starting of a third car in operation.

22. An elevator system having more than two elevator cars comprising; a plurality of landings served by the cars; call registering means for each of said landings; a home station for the cars; means for causing when the cars are idle each of said cars but one to be a home station car and said one car to be a free car; means for causing the cars in operation to answer registered calls; automatic by-pass means for each car operated in response to the load in that car reaching a certain percentage of capacity for causing that car to by-pass registered calls; means responsive to the first call registered for starting said free car in operation; and means responsive to the operation of said automatic by-pass means for said free car in operation when a call is in registration ahead of that car for starting a second car in operation from the home station and responsive to the operation of said automatic by-pass means for both of said cars in operation when a call is in registration ahead of such cars for starting a third car in operation from the home station.

23. An elevator system having more than two elevator cars comprising; a plurality of landings served by the cars; call registering means for each of said landings; means for each car for causing that car when in operation to respond to registered calls; means for selecting said cars; a home station for the cars; means for causing when the cars are idle a selected one of said cars to be a free car and the other cars to park at the home station; a car platform switch for each car operated in response to the load in that car reaching a certain percentage of capacity; means responsive to the first call registered for starting said free car in operation; and means responsive to the operation of said platform switch for said free car in operation when one or more calls are in registration ahead of that car for causing that car to by-pass such registered calls and for starting a selected home station car in operation and responsive to the operation of said platform switches for both of said cars in operation when one or more calls are in registration ahead of both of such cars for causing both of such cars to by-pass such registered calls and for starting the next selected home station car in operation.

24. An elevator system having more than two elevator cars comprising; a plurality of landings served by the cars; call registering means for each of said landings; means for each of the cars for causing that car when in operation to respond to the calls that are registered; by-pass means for each car responsive to the load in that car for causing that car to run past floors for which calls are registered; means responsive to the first call registered for starting one of said cars in operation; means responsive to a registered call behind said one car in operation or to the operation of said by-pass means for said one car and a registered call ahead of said one car for starting a second car in operation; and means responsive to a registered call behind both of such cars in operation or to the operation of said by-pass means for both of such cars and a registered call ahead of both cars for starting a third car in operation.

25. An elevator system having more than two elevator cars comprising; a plurality of landings served by the cars; call registering means for each of said landings; means for each of the cars responsive to registered calls, when that car is in operation, for causing stopping of that car at floors for which such calls are registered; by-pass means for each car responsive to the load in that car for causing that car to automatically by-pass registered calls; means responsive to the first call registered for starting one of said cars in operation; means responsive to a registered call behind said one car in operation or when a call is in registration ahead of said one car to the operation of said by-pass means for said one car for starting a second car in operation; and means responsive to a registered call behind both of such cars in operation, responsive to a registered call behind one of such cars and when a call is in registration ahead of such other car to the operation of said by-pass means for the other of such cars, or responsive to the operation of said by-pass means for both of such cars when a call is in registration ahead of both such cars for starting a third car in operation.

26. An elevator system having more than two elevator cars comprising; a plurality of landings served by the cars; call registering means for each of said landings; a home station; means for selecting said cars; means for each of the cars responsive to registered calls, when that car is in operation, for causing stopping of that car at floors for which such calls are registered; means responsive to the first call registered for starting a selected one of said cars in operation; means controlled by the position of said cars in operation with respect to calls for starting a selected home station car in operation in response to a registered call behind said selected one car in operation and for starting the next selected home station car in operation in response to a registered call behind both cars in operation; by-pass means for each car responsive to the load in that car for causing that car to automatically by-pass registered calls; and means responsive to said by-pass means for said one car when it is the only car in operation and a call is in registration ahead of that car for starting a selected home station car in operation and responsive to said by-pass means for both cars in operation when a call is in registration ahead of both cars for starting the next selected home station car in operation.

27. An elevator system having more than two elevator cars comprising; a plurality of landings served by the cars; call registering means for each of said landings; a home station; means for selecting said cars; means for each of the cars responsive to registered calls, when that car is in operation, for causing stopping of that car at floors for which such calls are registered; by-pass means for each car responsive to the load in that car for causing that car to automatically by-pass registered calls; means for causing when the cars are idle one car to serve as a free car and the other cars to park at the home station; means responsive to the first call registered for starting said free car in operation; means responsive to a registered call behind said free car in operation or when a call is in registration ahead of said free car to the operation of said by-pass means for said free car for starting the selected home station car in operation; and means responsive to a registered call behind both of such cars in operation, responsive to a call behind one of such cars and when a call is in registration ahead of the other of such cars to the operation of said by-pass means for such other car or when a call is in registration ahead of both of such cars responsive to the operation of said by-pass means for such cars for starting the next selected home station car in operation.

28. An elevator system of more than two elevator cars comprising; a plurality of landings served by the cars; call registeing means for each of said landings; a home station for the cars; means for each of said cars for causing that car when in operation to respond to the calls that are registered; by-pass means for each car responsive to the load in that car to automatically by-pass registered calls; means for causing when the cars are idle each of the cars but one to be a home station car and said one car to be a free car; means responsive to the first call registered for starting said free car in operation; means responsive to either a registered call behind said free car in operation, or when a call is in registration ahead of said free car to operation of said by-pass means for said free car, or to continuous registration for a given period of time after said free car is started in operation of a call or calls in overlapping relation ahead of said free car, for causing a second car to start in operation from the station; and means responsive to any one of the following: a registered call behind said free car in operation, or when a call is in registration ahead of said free car to operation of said by-pass means for said free car in operation, or to continuous registration for a given period of time after said second car is started in operation of a call or calls in overlapping relation ahead of said free car in operation, in combination with any one of the following: a registered call behind said second car in operation, or when a call is in registration ahead of said second car to operation of said by-pass means for said second car, or to the continuous registration for said given period of time of a call or calls in overlapping relation ahead of said second car in operation, for causing a third car to start in operation from the home station.

29. An elevator system comprising; two elevator cars; a plurality of landings served by the cars; call registering means for each of said landings; means for causing the calls that are registered to be answered by said cars; a home station; means operable when both cars are in operation answering calls for causing one of them to be returned to the home station when all calls are responded to; and means for interrupting the return of a car to the home station in response to continuous registration for a predetermined period of time of a call or of calls in overlapping relation.

30. An elevator system comprising; a plurality of elevator cars; a plurality of landings served by the cars; call registering means for each of said landings; means for causing the calls that are registered to be answered by said cars; a home station; means for returning all cars in operation but one to the home station; and means operable when all cars are in operation for interrupting the return of a car to the home station in response to continuous registration for a predetermined period of time of a call or of calls in overlapping relation ahead of the other cars, provided no call is registered for a floor below the returning home station car.

31. An elevator system comprising; a plurality of elevator cars; a plurality of landings served by the cars; call registering means for each of said landings; means for causing the calls that are registered to be answered by said cars; a home station; means for returning all cars in operation but one to the home station; and means operable when all cars are in operation and controlled by the time that overlapping calls ahead of the other cars are registered for interrupting the return of a car to the home station.

32. An elevator system comprising; a plurality of elevator cars; a plurality of landings served by the cars; call registering means for each of said landings; means for causing the calls that are registered to be answered by said cars; a home station; an automatic home station return circuit for each car; and means responsive, when all cars are in operation and one of them has its automatic home station return circuit completed and no call is registered for a floor below that car, to continuous registration for a predetermined time interval of a call or of calls in overlapping relation ahead of the other cars for interrupting said home station return circuit for said one car.

33. An elevator system comprising; a plurality of elevator cars; a plurality of landings served by the cars; call registering means for each of said landings; means for causing the calls that are registered to be answered by said cars; a home station; an automatic home station return circuit for each car; means for completing said home station return circuit for each car but one as it reaches its highest call; and means operable when all cars are in operation and one of them has its automatic home station return circuit completed for interrupting said home station return circuit for said one car in response to continuous registration for a predetermined time interval of a call or of calls in overlapping relation ahead of the other cars.

34. An elevator system comprising; two elevator cars; a plurality of landings served by the cars; call registering means for each of said landings; means for causing the calls that are registered to be answered by said cars; a home station; means operable when both cars are in operation for returning one of them to the home station when all calls are responded to; automatic by-pass means for each car; and means responsive to the operation of said by-pass means for one car for interrupting the return of the other car to the home station.

35. An elevator system comprising; a plurality of elevator cars; a plurality of landings served by the cars; call registering means for each of said landings; means for causing the calls that are registered to be answered by said cars; a home station; means for returning all cars in operation but one to the home station; automatic by-pass means for each car; and means operable, when all cars are in operation and a car is on its return to the home station, responsive to said by-pass means for the other cars and a call being in registration ahead of said other cars for interrupting said return.

36. An elevator system comprising; a plurality of elevator cars; a plurality of landings served by the cars; call registering means for each of said landings; means for causing the calls that are registered to be answered by said cars; a home station; means for returning all cars in operation but one to the home station; automatically by-pass means for each car; and means operable when all cars are in operation and controlled, when one of them is being returned to the home station, by said by-pass means for the other cars and a call being in registration ahead of said other cars for interrupting said return of said one car to the home station.

37. An elevator system comprising; a plurality of elevator cars; a plurality of landings served by the cars; call registering means for each of said landings; means for causing the calls that are registered to be answered by said cars; a home station; an automatic home station return circuit for each car; automatic by-pass means for each car for causing that car when in operation to by-pass registered calls; and means operable when all cars are in operation, one of them has its automatic home station return circuit completed and a call is in registration ahead of said other cars for interrupting said home station return circuit for said one car in response to the operation of said by-pass means for the other cars, provided no call is in registration below said one car.

38. An elevator system comprising; a plurality of elevator cars; a plurality of landings served by the cars; call registering means for each of said landings; means for causing the calls that are registered to be answered by said cars; a home station; an automatic home station return circuit for each car; means for completing said home station return circuit for each car but one as it reaches its highest call; automatic by-pass means for each car for causing that car when in operation to run past registered calls; and means operable when all cars are in operation and one of them has its automatic home station return circuit completed for interrupting said home station return circuit for said one car in response to the operation of said by-pass means for the other cars when a call is in registration ahead of said other cars and no call is in registration below said one car.

WILLIAM FRANK GLASER.
STEPHEN ANTHONY HORNUNG.

REFERENCES CITED

The following references are of record in the file of this patent:

UNITED STATES PATENTS

| Number | Name | Date |
|---|---|---|
| 1,904,647 | Lindquist et al. | Apr. 18, 1933 |